No. 693,445. Patented Feb. 18, 1902.
A. V. RUCKMICH.
TYPE SETTING MACHINE.
(Application filed Feb. 8, 1901.)
(No Model.) 9 Sheets—Sheet 2.
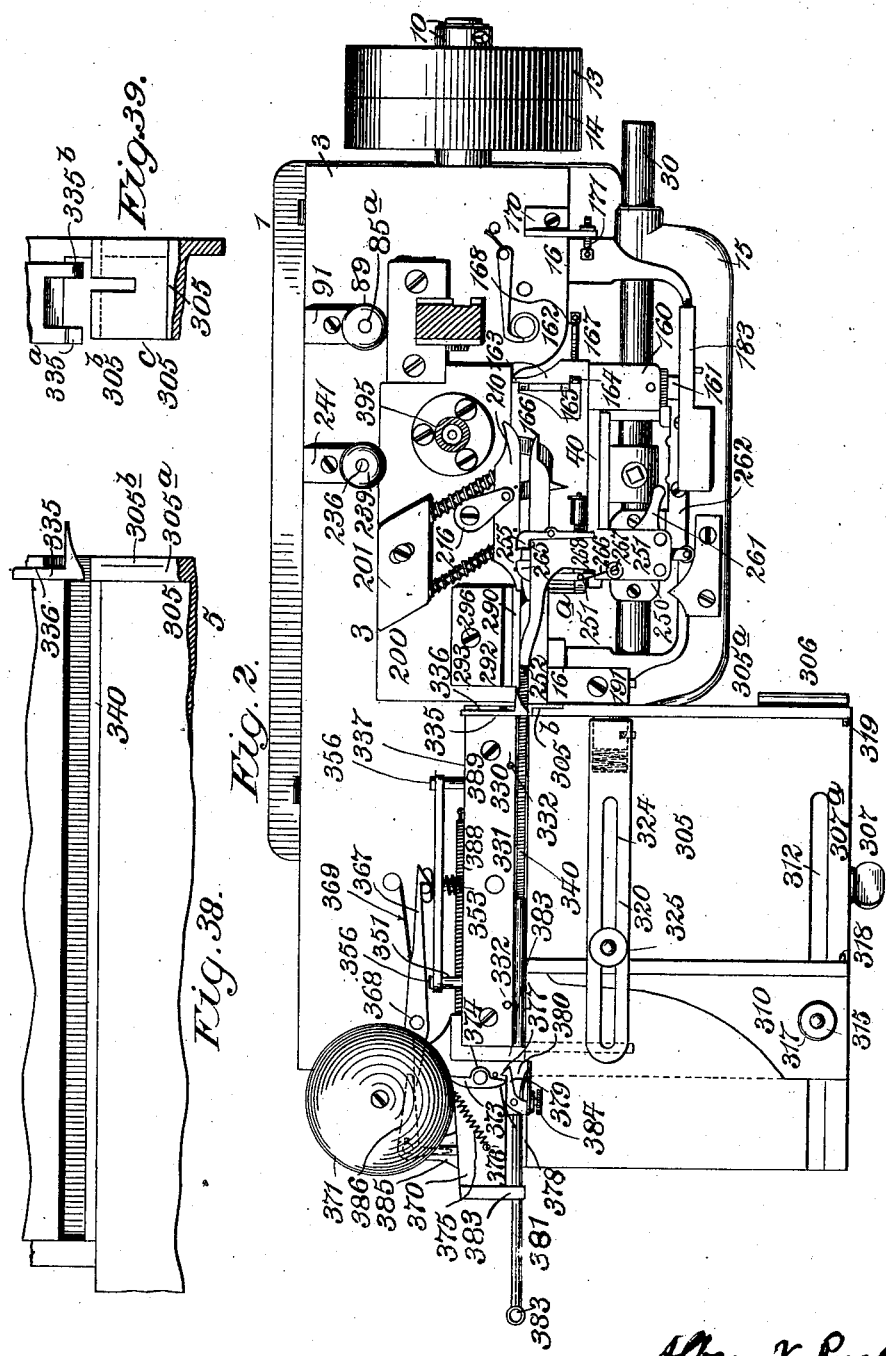

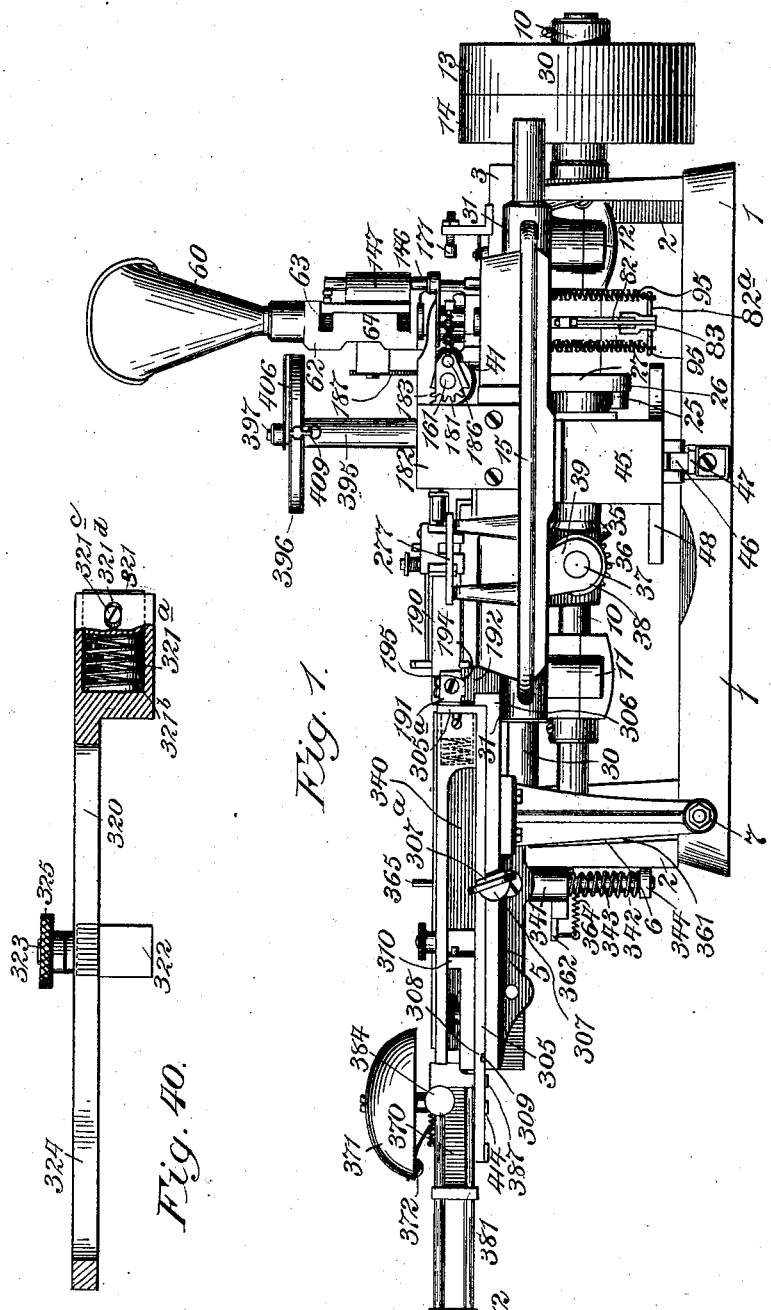

No. 693,445. Patented Feb. 18, 1902.
A. V. RUCKMICH.
TYPE SETTING MACHINE.
(Application filed Feb. 8, 1901.)
(No Model.) 9 Sheets—Sheet 3.
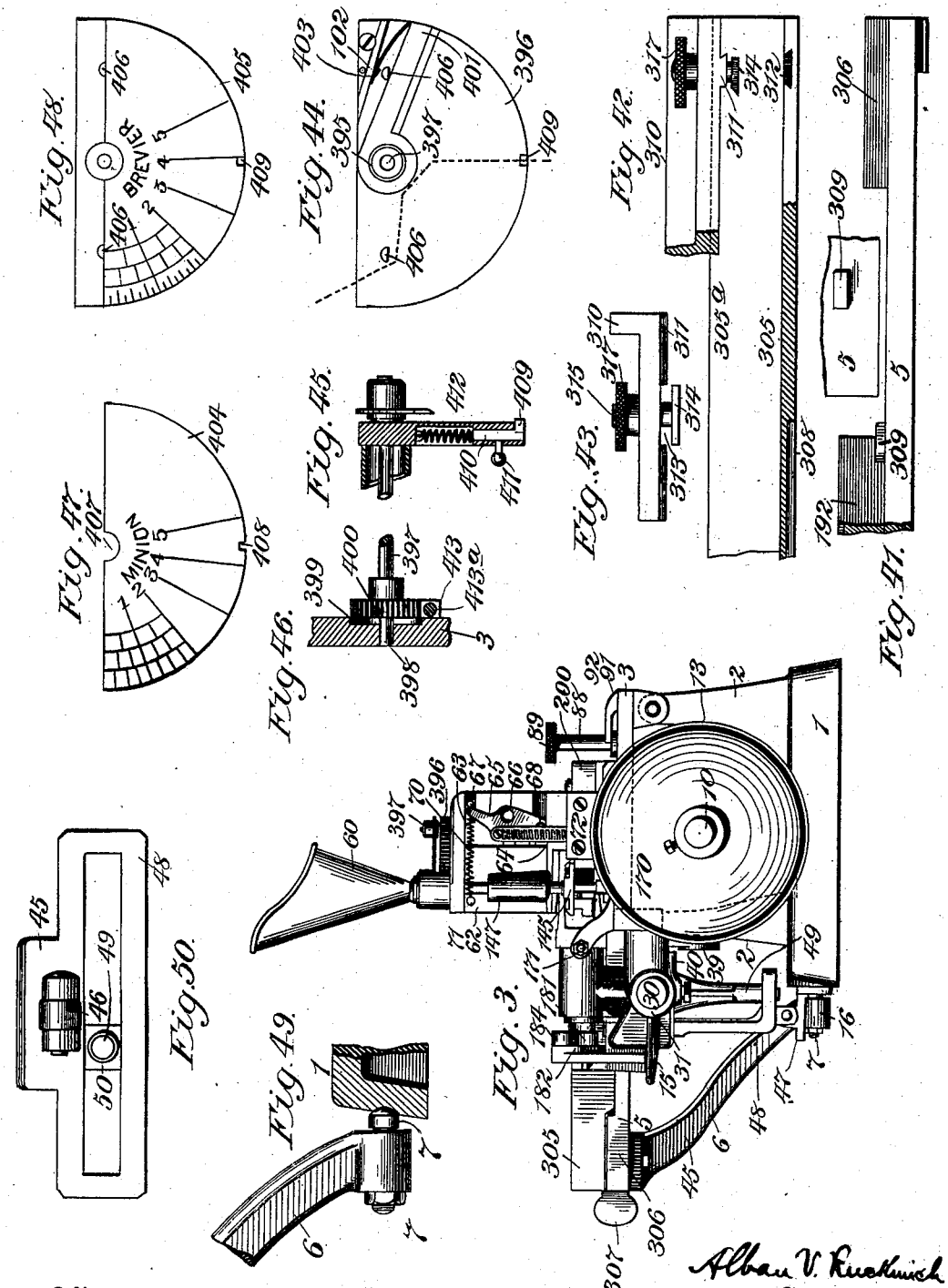

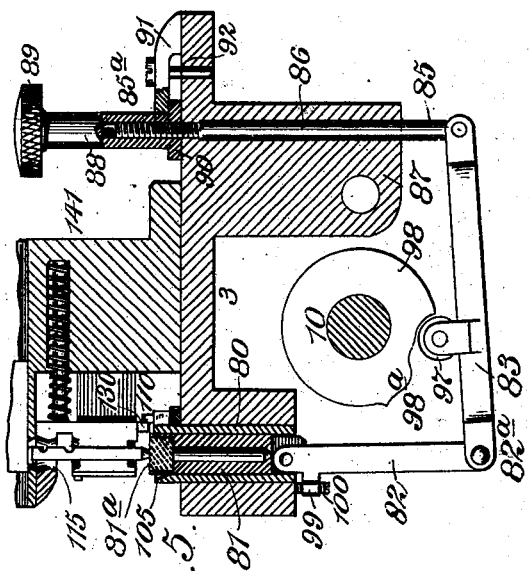

No. 693,445. Patented Feb. 18, 1902.
A. V. RUCKMICH.
TYPE SETTING MACHINE.
(Application filed Feb. 8, 1901.)
(No Model.) 9 Sheets—Sheet 5.
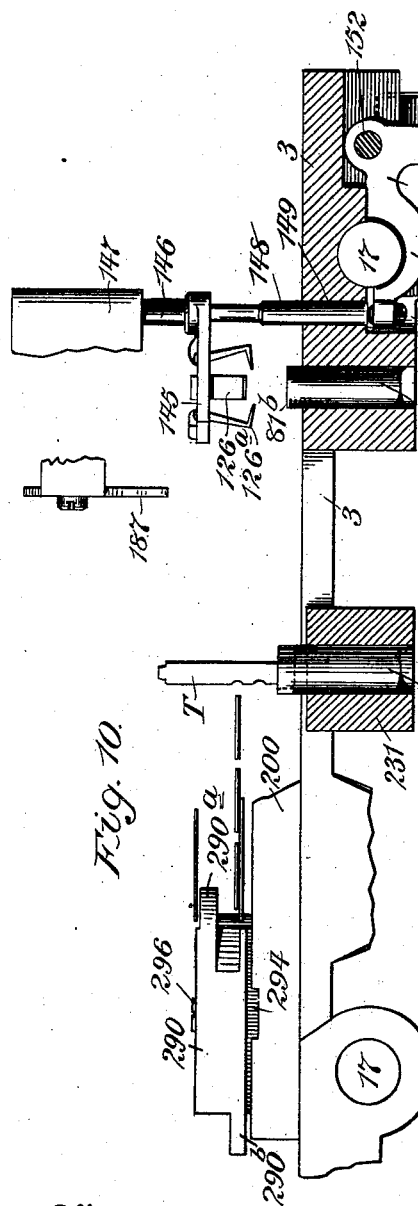
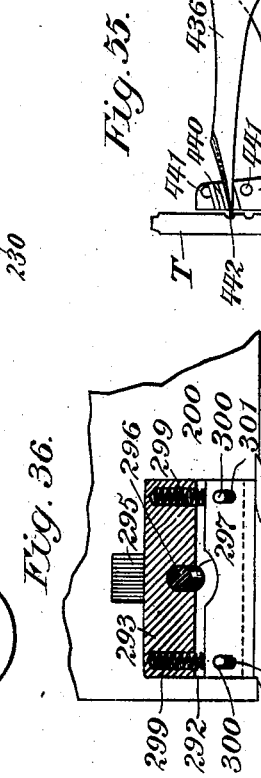
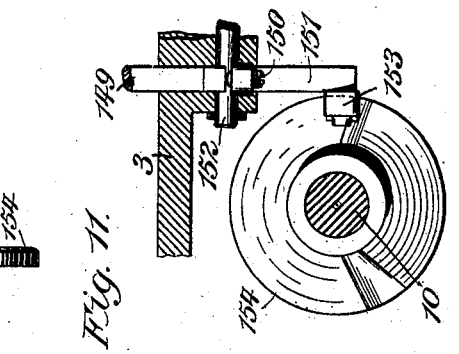
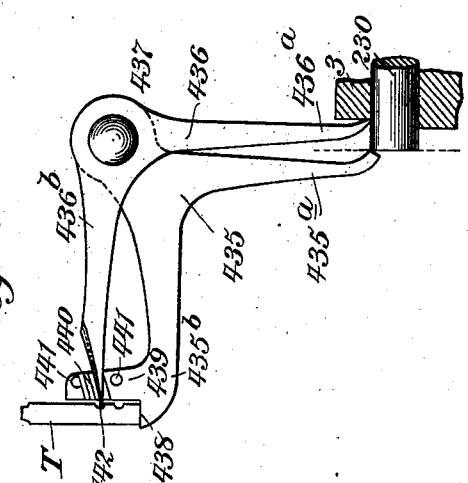
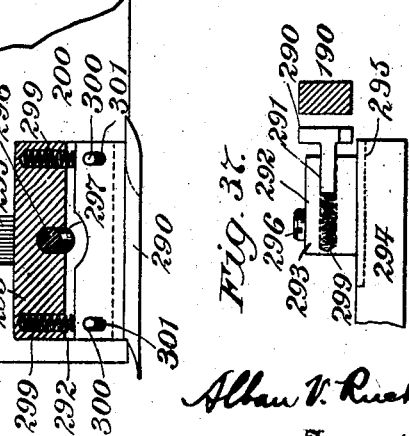

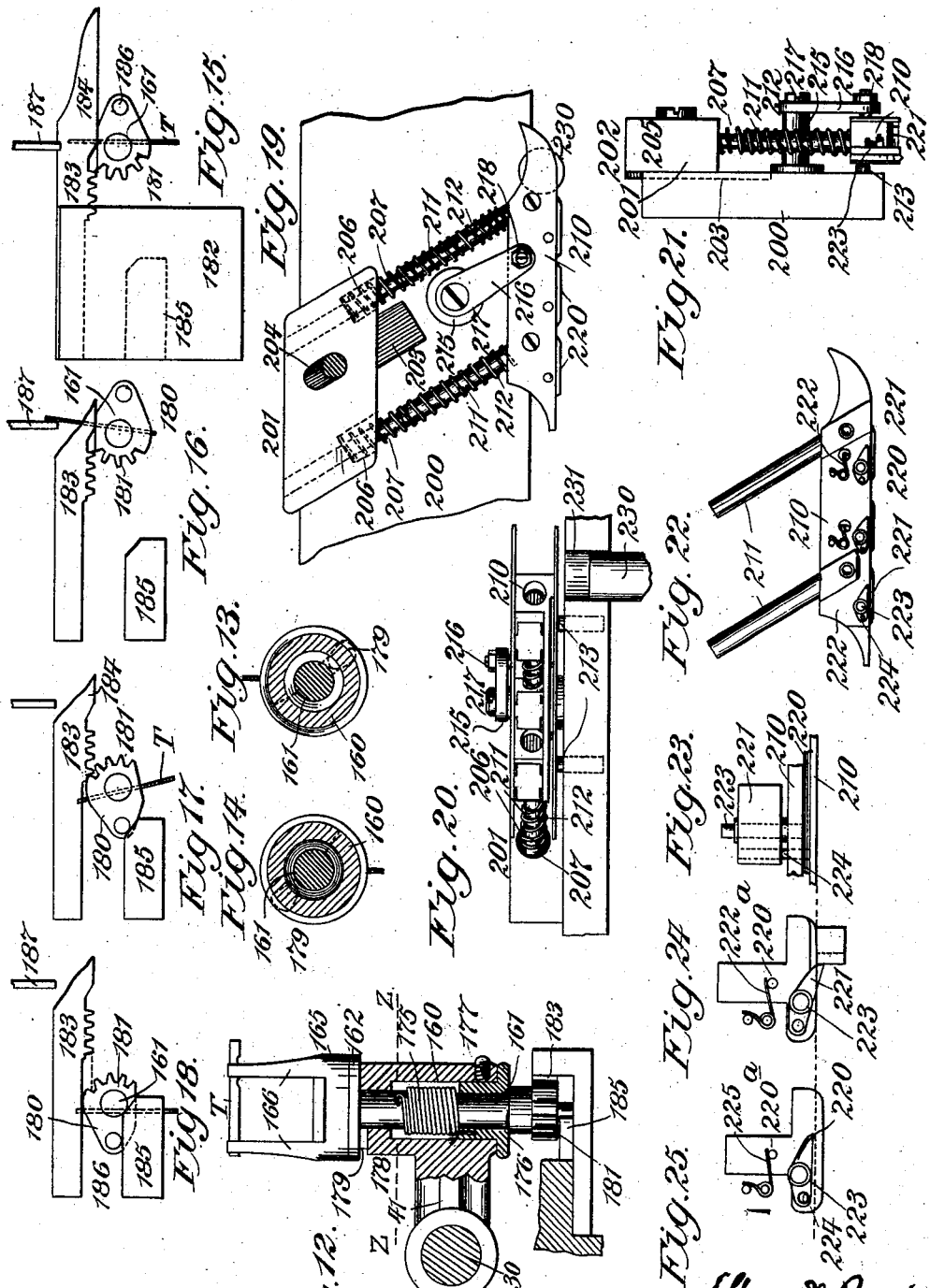

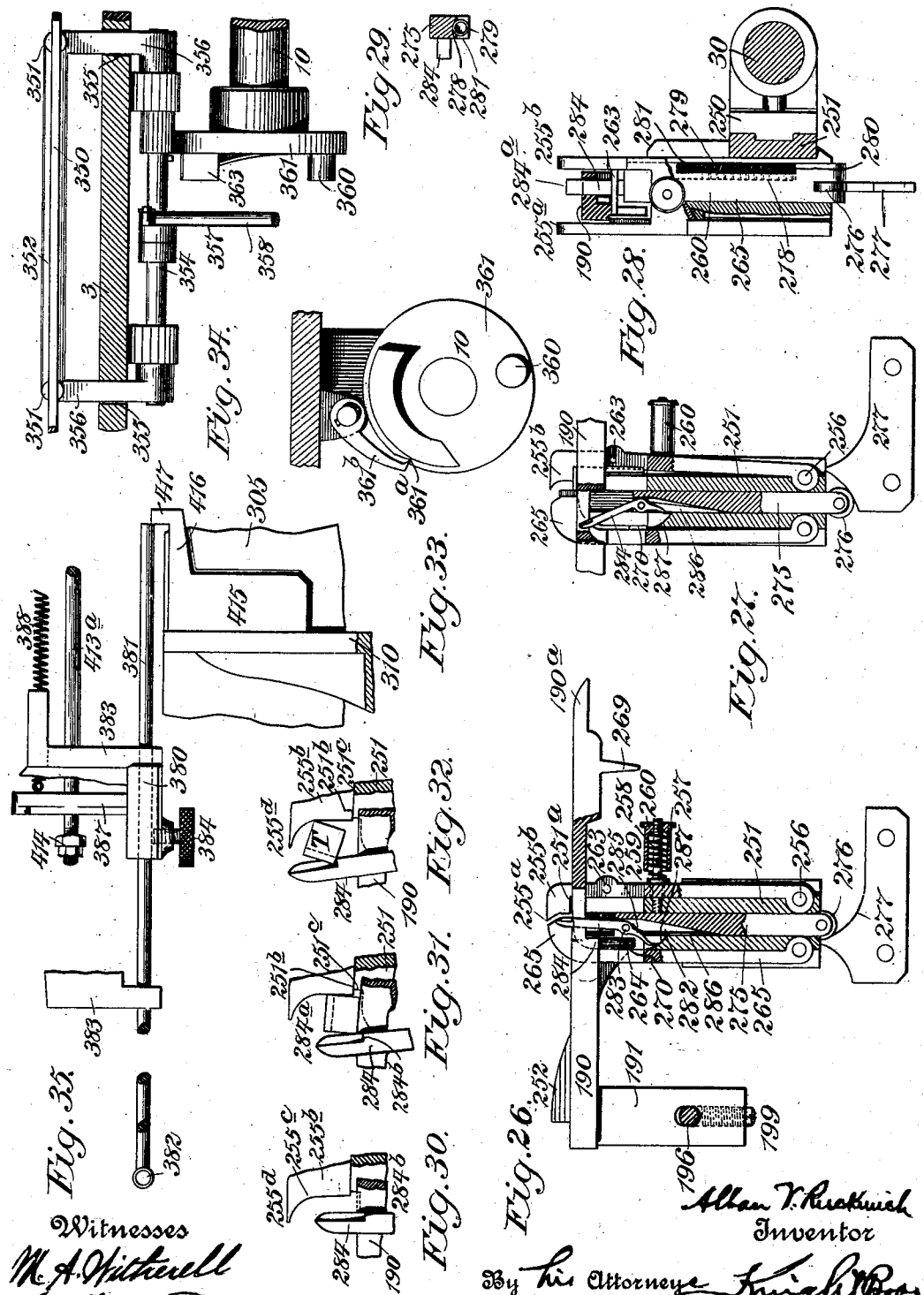

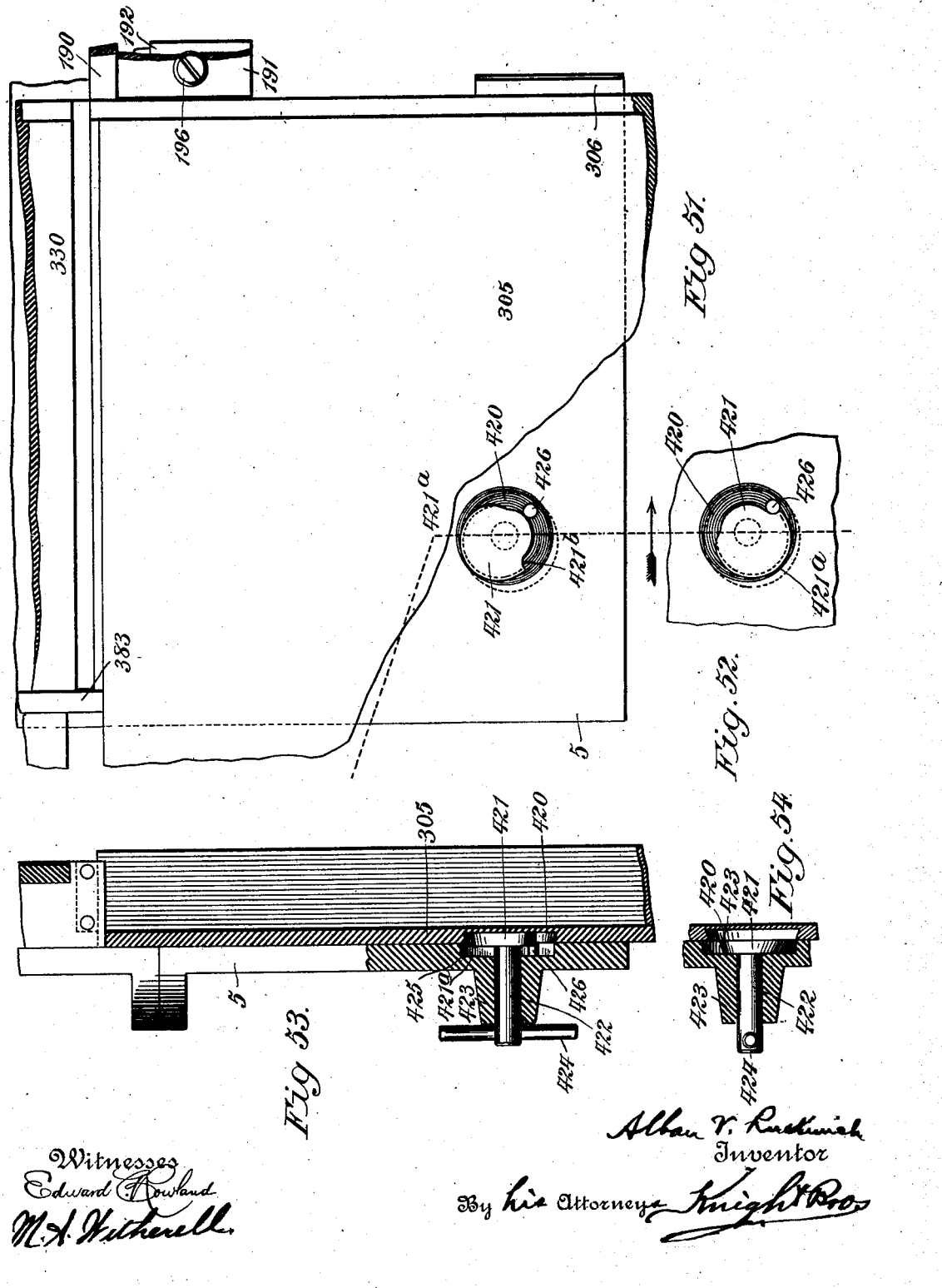

No. 693,445. Patented Feb. 18, 1902.
A. V. RUCKMICH.
TYPE SETTING MACHINE.
(Application filed Feb. 8, 1901.)
(No Model.) 9 Sheets—Sheet 9.
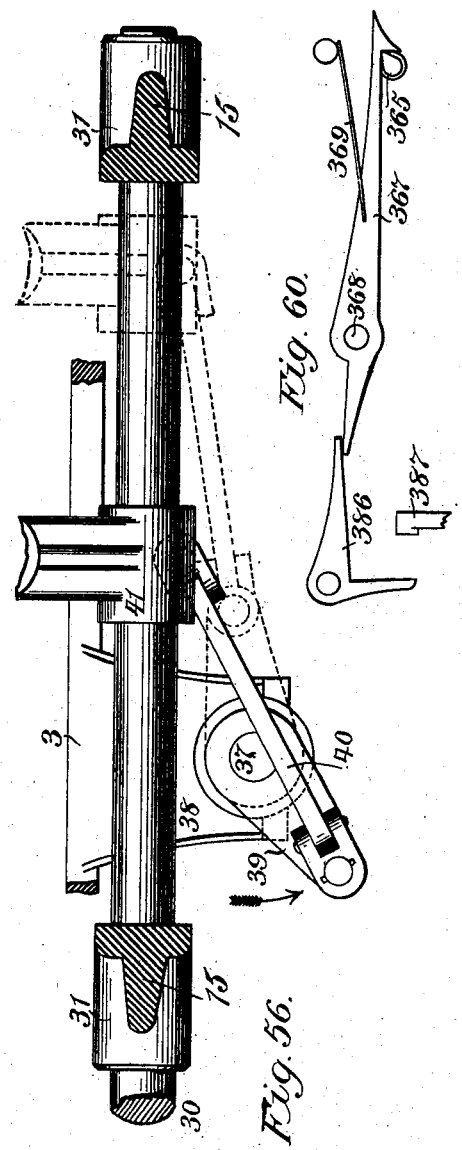
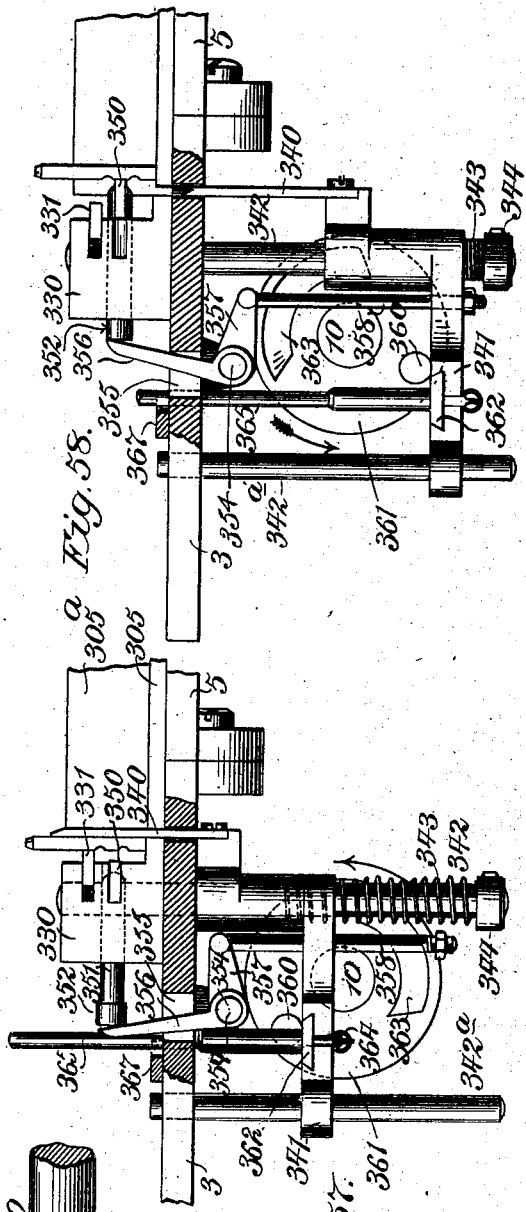
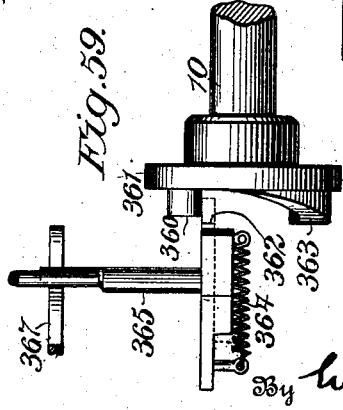

UNITED STATES PATENT OFFICE.

ALBAN V. RUCKMICH, OF BROOKLYN, NEW YORK, ASSIGNOR TO JOSEPH D. BAUCUS, OF NEW YORK, N. Y.

TYPE-SETTING MACHINE.

SPECIFICATION forming part of Letters Patent No. 693,445, dated February 18, 1902.

Application filed February 8, 1901. Serial No. 46,542. (No model.)

*To all whom it may concern:*

Be it known that I, ALBAN V. RUCKMICH, a citizen of the United States, residing in the borough of Brooklyn, city of New York, and State of New York, (whose post-office address is No. 446 Harman street, Brooklyn, New York,) have invented certain new and useful Improvements in Type-Setting Machines, of which the following specification is a full, clear, and exact description.

My present invention relates to certain improvements in the style of type setting and composing machines set forth in my Patent No. 493,448, granted March 14, 1893; and the main objects of my present invention are, first, to produce a universal machine which will be capable of operating various fonts of type by simple and readily-effected adjustments; second, to provide for composing lines of any desired length by means of an adjustable galley, and, third, to improve and strengthen the general construction of such machines for increasing their durability and speed and accuracy in operation and rendering them more generally satisfactory for commercial purposes.

The general plan of construction and operation of my improved machine is the same as in the machine set forth in my above-named patent, my present invention consisting in improvements in the main operative parts of such a mechanism and in the addition of certain new parts which improve the work of the machine.

In my improved machine the type arresting and regulating gates or traps in the hopper are simplified and are operated by a single lever. The type plungers or lifters are independently operated and are provided with independent adjusting devices for regulating their strokes and operative positions to suit different fonts of type. These adjusting means render the machine universal. The gates or traps and the type plungers or lifters are faced with fiber or other suitable cushioning material to prevent the wear and injury of the type. Flaring mouths or openings are formed at the outlet of the hopper and at the upper end of the socket or casing supporting the first type plunger or lifter beneath the hopper for the purpose of more effectually centering the type when acted upon by the plunger or lifter and the type-feelers preparatory to the removal of the type from beneath the hopper by the pincers or tumbler-carrier. The tumbler-carrier is also improved in construction in that a more positive tumbler-rotating device is employed, and means are provided for positively limiting its extent of rotation in both directions. The type-rotating shuttle is provided with three independent type-engaging dogs controlled by three independent type-actuated ribs and is provided with improved mounting and adjusting devices to insure greater accuracy in operation under varying conditions. The second type-carrier, which moves the successive type through the type-race past the shuttle, has an adjusting device for regulating the extent of opening of the jaws, and the jaws are of improved construction and are formed with peculiarly-shaped type-engaging faces which, combined with the structure of the body portion of the carrier, are more effective than the old forms of such devices in assisting the rotation of the type upon their longitudinal axes under the action of the shuttle-dogs.

I have discovered in experimenting with type-setting machines of this style that variations in the depth of the nicks in the faces of type sometimes cause the machine to fail in properly facing the type for the following reason: The turning of a type one or more times upon its longitudinal axis under the action of the shuttle (to cause it to face in the proper direction) is effected by the engagement of one or more of the shuttle-dogs with the adjacent forward corner of the type as it is moved through the type-race past the shuttle by the second type-carrier, the shuttle-dogs being normally in inoperative position and moved into operative position at the proper moments to engage the type by the movable ribs of the shuttle, which are in turn operated by the engagement therewith of the plain faces of the type. When the type has been turned sufficiently to present its nicked face in the proper direction—that is, toward the shuttle—one of the nicks will be in the horizontal plane of the dog-controlling ribs and will ride over them without effect, allowing the shuttle-dogs to remain in inoperative position, and the type will proceed without further altering its position to the galley. When the type is in position for making its final turn to bring its nicked face against the shuttle, it will be clear that the nicks of the type traverse the forwardly-presented face of the type-body and extend through the forward corner of the plain face, which is at a right angle thereto and is presented toward the shuttle, so that the dog-controlling rib of the shuttle will at first be pressed back by the engagement of said plain face of the type-body to cause the dog to project and engage the forward corner of the type-body for turning the type; but just as soon as the type has been partially turned the nicked corner of the type will be presented over the said controlling-rib and will release or partially release the pressure upon the rib and withdraw or partially withdraw the shuttle-dog from engagement with the type, the amount of release of pressure upon the rib and withdrawal of the dog depending upon the depth of the nick in the type-body. If the nick is only of normal depth, the shuttle-dog will not be disengaged from the turning type until the final turn of one-quarter of a revolution is more than half completed, when the pressure of the spring-jaws of the second type-carrier will effect the completion of the turn. If, on the other hand, the nick in the type is unusually deep, as is sometimes the case, the shuttle-dog will be disengaged from the turning type before its final turn is half completed, and the pressure of the spring-jaws of the type-carrier upon the type will cause the type to be turned back with its nicked face presented forwardly again. If a type having such unusually deep nicks in its body is presented to the shuttle in a position needing only this one final turn to place it in proper position, each one of the shuttle-dogs will fail to give it the final turn for the reason just explained, and the type will not be placed in the galley facing the proper way.

To overcome the difficulty just pointed out at some length, I have devised an auxiliary type-turning device, which I term a "kicker." This kicker, which is a very important and broadly novel feature of my machine, is preferably mounted upon the second type-carrier and is constructed to impart the final turn to the type in case of the failure of the shuttle-dogs and has no effect upon the type if it has previously been placed in proper position by the shuttle. This kicker comprises a ribbed dog or finger formed with a type-engaging shoulder at the inner end of its rib of the same depth as the rib, and it is mounted upon the second type-carrier and provided with operating means to impart a movement to it transverse to the movement of the type in the type-race. In addition to its movement transverse to the type-race the kicker dog or finger has a pivotal movement which enables it to move into engagement with the forwardly-presented face of the type-body. The rib of the kicker dog or finger is supported in the same horizontal plane as the dog-controlling ribs of the shuttle, so that it will be in the proper plane to engage the determining nick in the type-body. If the type in the type-race is in proper position with its nicked face presented toward the shuttle, a plain face of the type-body will be presented forwardly in the race and the ribbed kicker will come in contact with this plain face and the rib will prevent the engagement of the shoulder with the type, and hence the type will not be turned in the type-race. If, on the other hand, the type is not in proper position when the kicker is operated, the nicked face of the type-body will be presented forwardly in the type-race, and when the kicker closes on the type its rib will enter the nick and allow its shoulder to engage the corner of the type and turn it around into proper position. The spring-jaws of the second type-carrier coöperate with the kicker to assist it in its work, and the peculiar shape of the jaws is important in this connection. An adjustably-mounted spring-pressed friction plate or block is arranged adjacent to the type-shuttle and forms with the shuttle the yielding side wall of the type-race. The opposite side wall of the type-race is formed by an adjustable and removable rigid sill, which has adjustable means for determining its position in the machine. I employ a removable galley, which can be taken off when it is filled with a composition of type and a new one put in its place. The galley is provided with novel securing means and an adjustable wall, which enables the operator to compose matter with any desired length of lines. I employ an improved cut-off mechanism for advancing the lines as they are completed in the section of the type-race at the rear of the galley, and I also provide an adjustable line detecter or feeling device having means for actuating the cut-off mechanism and indicator. The indicator is of improved construction and is provided with removable and changeable dials or indicator-plates to adapt the machine to different fonts of type.

My invention consists of various other features of construction, and in order that my invention may be fully understood I will now proceed to describe the same with reference to the accompanying drawings and will afterward point out the novelty with more particularity in the annexed claims.

In said drawings, Figure 1 is a front elevation of my improved type setting or composing machine. Fig. 2 is a plan view of the same. Fig. 3 is an end elevation of the same looking at the right-hand end of Figs. 1 and 2. Fig. 4 is a detail transverse sectional elevation illustrating the arrangement and operation of the traps or gates in the type-chute. Fig. 5 is a similar view illustrating the first type-lifting plunger and its adjustable operating mechanism. Figs. 6 and 7 are detail plan views of the type-guiding and nick-engaging devices located directly beneath the lower trap or gate of the type-chute, the parts being in closed position in Fig. 6 and in open position in Fig. 7. Figs. 8 and 9 are detail plan views of the sectional flaring upper end of the socket or casing of the first plunger-lifter, Fig. 8 representing the movable part in closed position and Fig. 9 said part in open position. Fig. 10 is a detail central longitudinal sectional elevation of part of the machine, illustrating the operating mechanism of the type-feelers and the relative location of the two type-lifting plungers, the projection for starting the rotation of the tumbler-carrier, the ribs of the type-turning shuttle, and spring-pressed friction-plate of the type-race. Fig. 11 is a detail sectional view of the operating mechanism of the type-feelers. Fig. 12 is a detail vertical sectional elevation of the first or tumbler type-carrier. Figs. 13 and 14 are detail transverse sectional views of the same, taken on the line z z of Fig. 12 and representing in dotted lines the limits of rotation of the carrier-head in its body. Figs. 15, 16, 17, and 18 are detail end elevations illustrating the tumbler-carrier-rotating devices in progressive positions. Fig. 19 is a detail plan view of the type-turning shuttle mechanism. Fig. 20 is a front view of the same. Fig. 21 is an edge view of the same. Fig. 22 is a detail plan view of the shuttle removed from its supporting-block and having its top plate removed to show the arrangement and construction of type-turning dogs. Fig. 23 is an enlarged detail front elevation of one of the type-turning devices of the shuttle. Figs. 24 and 25 are enlarged detail plan views of one of the type-turning dogs and its controlling-rib, illustrating their two positions. Fig. 26 is a detail sectional plan view illustrating the second type-carrier and type-turning kicker and the adjustably-mounted rigid sill of the type-race, the type-carrying jaws and kicker being in closed or operative position. Fig. 27 is a similar view showing the type-carrying jaws and kicker in open or inoperative position. Fig. 28 is a detail sectional edge view of the same. Fig. 29 is a transverse sectional view of the kicker. Figs. 30, 31, and 32 are detail plan views illustrating the operation of the kicker-finger with relation to the coöperating jaw of the second type-carrier. Fig. 33 is a detail end elevation illustrating the cam which operates the composing-rule and line cut-off and the device for preventing backward rotation of the machine. Fig. 34 is a detail sectional elevation illustrating the line-cut-off mechanism. Fig. 35 is a detail plan view illustrating the line-feeling device which controls the line cut-off and operates the line-indicator and the gage by which the line-feeling device is adjusted. Figs. 36 and 37 are respectively a detail sectional plan and a detail end elevation of the adjustable spring-pressed friction plate or block forming part of one wall of the type-race. Fig. 38 is a detail plan view of the section of the type-race which is located in rear of the galley, also showing a portion of the galley and the spring-actuated gate which extends across the type-race and confines the type-line in the race-section back of the galley. Fig. 39 is a detail elevation of the said gate and a part of the galley. Fig. 40 is a detail longitudinal sectional elevation of the adjustable galley-block. Figs. 41, 42, and 43 are detail views illustrating the removable galley and its adjustable side wall. Figs. 44, 45, 46, 47, and 48 are detail views of parts of the line-indicator. Fig. 49 is a detail view of part of the brace for the auxiliary plate or galley-support. Fig. 50 is an underneath elevation of the bracing and guiding bracket arm and yoke for the type-carrier frame. Figs. 51, 52, 53, and 54 are detail views illustrating a modified form of device for securing the removable galley upon its support. Fig. 55 is a detail elevation of the improved gage for indicating the proper amount of projection of the type-lifting plungers from their casings to suit the location of the determining-nick upon the type of the font to be composed by the machine. Fig. 56 is a detail sectional plan view showing the mechanism for reciprocating the supporting-bar of the type-carriers. Figs. 57 and 58 are detail transverse sectional elevations of the composing-rule, the line cut-off, and their operating mechanism. Fig. 59 is a detail sectional elevation of part of the operating mechanism for the composing-rule and line cut-off. Fig. 60 is a detail plan view of the controlling device for the line cut-off which is operated by the line-feeling device.

The same parts are indicated throughout the several figures of the drawings by the same reference-numerals.

I prefer to construct my improved type-setting machine upon a suitable base 1, having four upwardly-projecting standards 2, to the rear ones of which is hinged at its rear edge a platform 3, which supports all of the operative parts of the machine, as hereinafter described. The platform 3, hinged to the rear standards, rests at or near its forward edge upon the front standards, and the four standards support the platform in a horizontal plane at a suitable distance from the base 1 to accommodate the operative parts of the machine which project beneath the platform, and at the same time the platform may be lifted upon its hinges to expose the operative parts of the machine beneath the platform for repair or adjustment.

At the left-hand end of the platform 3 a galley-supporting plate or auxiliary platform 5 is rigidly secured to the main platform 3 and projects forwardly therefrom in the same plane. Depending from the galley-supporting plate or platform 5 is a rigid bracing arm or bracket 6, provided at its lower end with an adjustable screw-stop 7, which is adapted to engage the front edge of the machine-base 1 and assist in supporting the auxiliary platform or plate 5 to hold the same rigid when the machine is operating. This auxiliary support or brace 6 is especially important in sustaining the weight of the galley when it is filled with type.

10 is the main operating-shaft of the machine, journaled at 11 and 12 beneath the supporting-platform 3 and carrying at its right-hand end the fast and loose pulleys 13 and 14. Mounted upon the main shaft 10 in proper positions along its length are several cams, gears, &c., by which the operative parts of the machine are operated.

15 is an auxiliary carrier-supporting frame or yoke formed with rearwardly-extending cylindrical rods or studs 16, which fit and slide freely in the tubular sockets 17, formed on the under face of the supporting-platform 3. The auxiliary carrier-frame is reciprocated transversely of the machine by means of a counter-shaft journaled in suitable bearings and provided at its ends with rock-arms connected through links with extensions of the bearing-studs 16 of the carrier-frame and rock-arms (one of which, 25, is shown) keyed to the counter-shaft and carrying antifriction-rollers, (one of which, 26, is shown,) which are operated by a cam 27, carried by the main operating-shaft 10. This structure is practically the same as used in my above-named patent.

30 is a reciprocating type-carrier-supporting rod or bar mounted to slide in tubular bearings 31 of the auxiliary frame 15. This rod or bar 30 supports the first and second type-carriers and causes them to reciprocate longitudinally of the machine in a manner hereinafter explained, the reciprocations of said carriers transversely of the machine to cause them to grasp and release the successive type being effected by the transverse reciprocations of the carrier-supporting frame just explained.

The rod or bar 30 is reciprocated in the auxiliary frame 15 by means of a gear 35 on the main shaft 10 meshing with a companion gear 36, keyed to a short auxiliary shaft 37, journaled in a depending bracket or lug 38 of the supporting-platform 3 and carrying at its forward end a crank 39, connected through a pitman 40 with the bracket 41, (of the first type-carrier,) which is rigidly mounted upon the reciprocating rod 30. The pitman 40 has universal-joint connections at its ends with the crank 39 and bracket 41 to allow for the transverse reciprocation of the auxiliary supporting-frame.

To insure the rigidity of the auxiliary carrier-supporting frame 15, I provide a depending bracket-arm 45, which is rigidly mounted upon the said auxiliary frame 15 and has journaled in its lower end an antifriction-roller 46, which rests and travels upon the upper surface of a bracket 47, firmly secured to the base-plate 1. This bracket-arm 45 has formed integral with it a guide yoke or loop 48, extending at right angles to it, so as to rest normally in a horizontal plane. Keyed to the reciprocating rod or bar 30 is a depending guide-arm 49, carrying at its lower end a guide-block 50, which fits snugly in the guide loop or yoke 48 and travels therein as the rod or bar 30 reciprocates. By this means the rod or bar 30 is held absolutely against rotative motion in its bearings, so as to accurately hold the two type-carriers, hereinafter described, in a horizontal plane. This is very important to the proper operation of the machine.

60 is the type-receiving funnel or hopper, into which the composer deposits the type successively. The hopper 60 is removably mounted in the upper end of a vertical type chute or passage-way 61, formed in the casting 62, which is rigidly mounted upon the upper face of the supporting-platform 3. The type chute or passage-way 61 is traversed or cut off at two points separated by a vertical distance a little greater than the length of the ordinary printing-type by means of transversely-reciprocating traps or valves 63 and 64, which operate in suitable guideways or openings formed in the casting 62. These traps or valves 63 and 64 are faced on their upper surfaces with fiber or other suitable cushioning material $63^a$ $64^a$ to prevent the wear and injury of the type by contact therewith.

65 is a lever journaled at 66 and engaging at its upper end a pin 67, projecting from the edge of the upper valve or trap 63, and having a forked lower end 68, which straddles a pin 69, projecting from the edge of the lower valve or trap 64. A spring 70 connects the pin 67 with a pin 71, projecting from the face of the casting 62 to give the trap or valve 63 a spring tendency to close and the trap or valve 64 a spring tendency to open. A vertically-reciprocating rod or bar 72 is journaled at 73 to the lever 65 and carries at its lower end, beneath the supporting-platform 3, an antifriction-roller 74, which runs upon a cam 75, mounted upon the main shaft 10. A spring 76 connects a pin 77, projecting from the upper end of rod or bar 72, with a stationary pin 78, projecting from the face of casting 62 and extending through slot 79 in the bar 72, just above the platform 3. This spring 76 operates in conjunction with the spring 70 to tend to close the valve or trap 63 and hold the rod or bar 72 into operative relation with the cam 75. The trap or valve 63 is opened and the trap or valve 64 is closed by the action of the cam 75, while these traps or valves are moved into their opposite positions by the action of the springs just described, it being clear that the traps or valves operate alternately, one being open while the other is closed.

Directly beneath the type chute or passage-way 61, above described, is mounted, in a suitable vertical opening in the supporting-platform 3, a tubular casing 80, in which operates a vertically-reciprocating plunger or type-lifter 81, which is journaled to the upper end of the rod or pitman 82, which is in turn pivotally mounted upon the forward end of a rock arm or lever 83, which is journaled at its opposite end to the lower end of the vertically-adjustable rod 85, which extends up through a suitable opening 86 in a cast lug or bearing 87, projecting beneath the platform 3. The upper end of the rod 85 is screw-threaded, as shown at 85$^a$, and screwed onto the said threaded end of the rod is an interiorly-threaded adjusting-post 88, formed with a milled hand-wheel 89 at its upper end and a flange or collar 90 at its lower end, which is engaged by the forked bracket 91, secured to the platform 3 by screw 92 for confining the adjusting-post 88 upon the platform 3 and clamping it in the desired adjusted position and preventing the vibrations of the machine changing the adjustment. The journal-pin 82$^a$, which pivotally connects the rod or pitman 82 with the forward end of lever 83, is extended upon both sides of the lever 83, and these extensions of the pin 82$^a$ are engaged by the spiral springs 95, which are connected at their upper ends with pins or lugs projecting from the lower face of the platform 3. The springs 95 tend to raise the plunger or lifter 81 in its casing and also to hold the antifriction-roller 97, journaled upon lever 83, in operative relation with the cam 98, mounted upon the main shaft 10. The rod or pitman 82 is formed with a forwardly-projecting lug or shoulder 99, through which is threaded a small adjustable screw-stop 100, which is adapted to engage the under face of the platform 3, adjacent to the socket or casing 80, and limit the upward movement of the plunger or type-lifter 81 under the action of the springs 95. By rotating the adjusting-post 88 the fulcrum of the lever 83 can be raised or lowered to regulate the stroke of the lever 83, which operates the type-lifter or plunger 81. The adjustment of the fulcrum of lever 83 is to regulate the height of the plunger 81 in its socket when it is in its lowest or type-receiving position, the stop 100 serving to determine the high position of the plunger. The adjustment of the type-receiving position of the plunger 81 is very important, in that it enables the operator to reduce the operative or type-lifting stroke of the plunger to a minimum, so as to avoid unnecessary momentum of the plunger under the action of its lifting-springs and reduce the shock and possibility of injury to the type when their upward movement is arrested by the engagement of one of the feelers with the type notch or nick. This adjustment is always made while the lever 83 is on the intermediate circular portion of cam 98. When the type is passed through the type-chute 61 with its face up, it is necessary that the plunger support the type only low enough to bring the determining type notch or nick below the type-feelers, so that one of the feelers will engage the type-nick when the plunger raises the type.

The upper end of the socket or casing 80 of the type lifter or plunger is extended beyond the platform 3 in the form of a cup 105, having an upwardly-flaring or gradually-widening mouth. The purpose of this flaring-mouthed cup 105 is to guide the type into the socket to insure its falling upon the upper end of the plunger or lifter 81 when it is dropped by the opening of the lower trap or valve 64. The upper end of the plunger or lifter 81 is faced with a layer or fiber or other suitable cushioning material 81$^a$ to prevent injuring the type when it falls from the lower trap upon the plunger. One side of the cup or extension 105 of the casing 80 is cut away, as shown at 105$^a$, to allow the passage of the type transversely therefrom when it is taken by the first type-carrier. This cut-out portion 105$^a$ is normally closed by a short section 106, shaped to fit snugly in the cut-out portion and complete the cup or socket 105. The section 106 is mounted upon the end of a lever 107, journaled to the platform at 108, and provided with a spring 109, which tends to close the section into the cut-away part 105$^a$ of the cup. Projecting from the upper face of the heel of the section 106 is a pin 110, by which the section is moved away from the cup 105 in the manner hereinafter explained.

The lower end of the type chute or passage-way 61 directly beneath the trap or gate 64 is formed with a downwardly-flaring opening 115, formed in a plate 116, secured to the casting 62. The plate 116 has a cut-out portion at 116$^a$ to allow the passage of the type transversely therefrom, which cut-out portion is normally closed by a plate-section 117, mounted upon the upper end of the sliding yoke 118, which is mounted upon the dovetail bar 119, which works in a suitable guideway formed in the face of the casting 62. A section or portion of the type chute or guideway 61 is formed in a skeleton frame, in which are pivotally mounted three of the spring-pressed feelers 126, which are constructed in the usual manner, as set forth in my above-named patent, No. 493,448. This section of the type-chute is separated from the cup 105 beneath it and the plate 116 above it to allow the passage transversely of the upper and lower fingers of the pincers of jaws of the first type-carrier, presently to be explained. A fourth spring-pressed feeler 126$^a$ is pivotally mounted upon the sliding yoke 118, so as to be capable of moving out of the path of the type to allow the first type-carrier to remove it from the type-chute. Projecting beneath the yoke 118 is a pin 130, which engages the pin 110 of section 106 to cause said section to be moved into open position simultaneously with the opening of the section of the type-chute formed by the skeleton frame, as described. The sliding dovetail bar 119 is operated at intervals by a suitable lever and cam, such as set forth in my above-named patent, No. 493,448. A spring 141 is mounted in the casting 62 and engages the yoke 118 for holding it normally in closed position with a yielding pressure, which is overcome at intervals for opening the gates in the type-chute by the action of the operating-cam.

145 is an open yoke mounted upon the vertically-sliding rod 146, which is mounted in a suitable bearing 147, formed on the face of the casting 62. This yoke 145 partially encircles the feelers 126 and rests directly beneath the heels of the feelers, so that when the yoke is raised the feelers will open to allow the type to pass them. This operation is the same as in my above-named patent. This yoke is intermittently raised by the engagement of the rod or bar 148, mounted in a socket 149 of platform 3 and resting on the end of the adjusting-screw 150 of the bell-crank lever 151, which is journaled at 152 beneath the platform 3 and carries an anti-friction-roller 153, which operates upon the cam-face 154, keyed to the main operating-shaft 10. The bell-crank lever 151 is downwardly curved at 151ª to avoid interfering with the right-hand bearing-stud 16 of the carrier-frame. The screw 150 can be adjusted to take up wear of the parts. Immediately after the feelers 126 are opened to allow the free passage of a type to the plunger 81 they are allowed to close around the type for straightening it or placing it upright on the plunger preparatory to its being raised by the plunger. The cam 98 is formed with a short high portion 98ª, which serves to draw the plunger away slightly from the type just as the feelers close upon it for the purpose of relieving the type from contact and friction of the plunger during the straightening action of the feelers. Immediately after the type has been straightened on the plunger the plunger moves the type up through the feelers, and if the type-face is presented upwardly one of the feelers will engage the type-nick and arrest its upward movement; but if the type-face is presented downwardly the type-nick will be above the feelers and cannot be engaged by them, and the plunger will raise the type until the stop 100 arrests the upward movement.

Formed integral with bracket 41, above referred to, is the tubular head 160 of the first or tumbler type-carrier, in which tubular head is journaled the shaft or axle 161 of the tumbler-carrier. Formed integral with the shaft or axle 161 is the tumbler-head 162, carrying two of the pincer-fingers 163 and formed with a transverse guideway or slot 164, in which is mounted the movable section 165 of the tumbler-head, upon which is formed the other pincer-fingers 166. A rod 167 extends through an opening in the tumbler-head 162 and is secured to the movable section 165 of the tumbler-head, a spiral spring 168 surrounding the rod 167 and being confined between the head of the rod and the tumbler-head 162 for yieldingly holding the section 165 in close contact with the tumbler-head 162 and the pincer-fingers 166 in contact with the pincer-fingers 163.

Mounted upon a bracket-arm 170, projecting from the platform 3, is an adjustable stop 171, with which the head of the rod 167 comes in contact as the tumbler-carrier is moved toward the right for opening the pincers at the end of the movement to the right and holding the pincers open until they move inwardly on opposite sides of the type held in the type-chute, when the continued inward movement of the tumbler-carrier causes the head of the rod to slip off of the stop and allows the pincers to close upon the type in readiness to carry it into the type-race.

Surrounding the tumbler-shaft 161, within the tubular head 160, is a spiral spring 175, one end of which is attached to the shaft 161, while the other end is attached to an adjustable collar 176, loosely surrounding the shaft 161 and held in any desirable adjusted position by means of a set-screw 177, threaded through the wall of the tubular head 160. By loosening the screw 177 the collar 176 can be rotated for adjusting the tension of spring 175. The purpose of the spring is to hold the rotatable tumbler-carrier in normal position with a yielding pressure.

The inner face of tubular head 160 is cut out at 178, and upon the inner face of the rotatable tumbler-head 162 is mounted a stop screw or pin 179, which positively limits the rotation of the tumbler-head within its casing in both directions by coming in contact with the ends of the cut-out portion 178 of the tubular head.

The outer end of the tumbler-shaft 161 has keyed to it a combination cam and segment-gear, the cam portion of which is indicated at 180, while the segment-gear is indicated at 181. Mounted upon a bracket 182 is a mutilated rack-bar 183, having a cam-engaging straight face 184. Upon the inner face of the bracket 182 is mounted a short guide rail or track 185, with which engages an eccentric pin or lug 186, projecting from the face of the combined segment-gear and cam 180 181. The purpose of these parts just described will now be explained.

When a type passes into the hopper with its face presented downwardly, it is necessary to reverse it before it has passed into the type-race. The plunger or type-lifter 81 raises such inverted type in the type-chute sufficiently far before they are grasped by the tumbler-carrier to insure the uppermost end of the type (which is in reality the base of the type) coming in contact with a stop-plate or lug 187, supported on the casting 62. The engagement of the type with the stop-plate or lug 187 while the tumbler-carrier is moved to the left starts the tumbler-carrier to rotate, and this partial rotation causes the segment 181 to mesh with the mutilated rack 183, which continues the rotation of the tumbler-carrier until it has made a complete half-turn, which will bring the face of the type uppermost. When the tumbler has completed its half-turn, as just described, the eccentric-pin 186, whose position will have been reversed, will engage the track 185 and slide thereon, so as to effectively hold the tumbler in its inverted position while it moves forward and outward to deposit the type in the type-race. The tumbler then moves to the right again, disengaging the eccentric-pin 186 from the track 185 and throwing the segment-gear 181 into mesh with the mutilated rack 183 again, which positively returns the tumbler to its normal position. When the tumbler-carrier takes a type from the chute with its face presented upwardly, the type will not project above the tumbler far enough to engage the stop-plate 187, and hence the tumbler will not be rotated. The purpose of the cam-face 180 and the straight face 184 is to hold the tumbler securely in horizontal position and prevent its rotation while it is grasping the type in the type-chute.

The type-race in which the type are deposited by the first or tumbler carrier just described is formed of a type-sill 190 on one side and a spring-pressed type-turning shuttle and a spring-pressed friction-block on the other side. The type-sill 190 is rigidly mounted upon a bar 191, which is secured to a lug or projection 192 of the platform 3. The lug or projection 192 is formed with a square groove 194 in its upper face, and the bar 191 is formed with a square rib or projection 195 on its lower face, which slidingly engages the square groove 194. A set-screw 196 passes through an elongated opening in bar 191 and is threaded into a suitable opening in the lug or projection 192, a washer being interposed between the head of screw 196 and the bar 191. An adjusting-screw 199 is threaded into the end of the bar 191 and is adapted to engage the set-screw 196. Before the screw 196 is screwed down tightly the adjusting-screw 199 is screwed inwardly or outwardly to move the sill 190 outwardly or inwardly, and when the sill has been placed in the desired position the set-screw 196 is screwed tightly to its seat to hold the type-sill rigidly in position. By means of this arrangement it will be observed that the type-sill can be removed for repair or for gaining access to other parts of the machine without the annoyance of losing the desired adjusted position, it being a simple matter to replace the sill in its old adjusted position by reason of the engagement of the adjusting-screw 199 with the shank of set-screw 196. The right-hand end of the type-sill 190 is formed with an outwardly curved or tapering lip 190ª to form with the receiving end of the shuttle, hereinafter described, a flaring opening for the reception of the type delivered to the race by the first type-carrier.

Mounted upon the upper face of the platform 3 is a bed-plate 200, upon which is supported the type-shuttle, which I will now describe.

201 is a block formed with a rib 202 on its lower face, which engages in a recess 203 of the upper face of the bed-plate 200. An elongated slot 204 is formed through the block 201, and a set-screw 205 passes through the slot 204 into a suitable threaded opening in the bed-plate 200. By this means the block 201, carrying the yieldingly-mounted shuttle, presently to be referred to, can be adjusted toward and away from the line of travel of the type. In the inner face of block 201 are formed the inclined circular recesses or openings 206, from which project the rods 207, arranged concentrically in said openings.

210 is the shuttle proper, formed of a suitable skeleton frame and having the guide-tubes 211 projecting rearwardly from it adjacent to its ends and at an angle and engaging and sliding upon or telescoping with the rods 207 of the adjustable supporting-block 201. Spiral springs 212 surround the guide-tubes 211 and rods 207, engaging the shuttle 210 and supporting-block 201 at their ends for giving the shuttle a constant spring-pressure in the direction of the type-sill 190. To avoid the chance of straining the guide-rods 207 and guide-tubes 211 by accidental downward pressure upon the shuttle 210, I provide upon the upper face of the bed-plate 200 two small lugs 213, above which the shuttle is normally supported just free of them, but sufficiently close to be supported by them in case of any unusual downward strain upon the shuttle. The lugs 213 also serve to support the shuttle when the parts become worn, and they insure the shuttle remaining in alinement. To avoid straining the shuttle-supporting rods and tubes upwardly, I provide a post 215 upon the upper face of bed-plate 200 at a point between the guide-rods 207 and guide-tubes 211 and rotatably mount upon this post 215 a short bracing-arm 216, which is secured to the post by a set-screw 217. In the outer end of the bracing-arm 216 is mounted an adjustable screw-stop 218. When the shuttle is put in place upon the bed-plate 200, the arm 216 is rotated upon the post 215 until the adjustable screw-stop 218 is directly above the shuttle, when the set-screw 217 is screwed securely in place to lock the arm in its operative position. The screw 218 is adjusted with relation to the shuttle to just clear the upper surface of the shuttle, so that the shuttle will be allowed to move freely without engaging the screw, the screw being, however, in position to resist any unusual upward movement which may by chance be imparted to the shuttle.

Sometimes the type have roughened places or accumulations of dirt upon them, which cause them to offer unusual resistance to the operation of some parts of the machine. When such type are held in the type-race between the type-shuttle and stationary sill and are raised by the operation of the second type-lifting plunger, hereinafter described, there is danger of upwardly straining the shuttle-supporting rods and tubes, the result of which would be that the type-nick would not be placed in proper alinement with the shuttle-ribs 220, hereinafter described. The bracing-arm 216 is particularly designed to resist such upward strain.

Mounted within the inner operative face of the shuttle 210, adjacent to the type-sill 190, are three independent type-turning devices, each one of which consists of a yieldingly-mounted rib 220, having operative connection with a pivotally-mounted type-turning dog 221. The rib 220 is formed with a rearwardly-extending guide-piece 220$^a$, which slides in a suitable recess formed in the shuttle and is engaged by a small spring 222, which causes the rib to be projected slightly beyond the surface of the shuttle. Each of the type-turning dogs 221 is journaled in the shuttle above its controlling-rib upon a journal-pin 223 and has its heel connected with the controlling-rib 220 through the medium of a small pin 224, which operates in a short slot in the wall of the shuttle, which separates the rib and the dog. Each of the type-turning devices is of the construction just described.

The old shuttle of my Patent No. 493,448, above referred to, caused trouble at times, because the spring-pressure was not properly distributed, and caused the shuttle to have a tendency to bind. To overcome this objection, it was necessary to mount the shuttle loosely, and then it would cause trouble at times by yielding the depth of the type-nick and failing to properly turn the type. My present construction and mounting of the shuttle, as above described, obviate the objections pointed out. The adjustment of the shuttle-supporting block toward and away from the stationary sill enables the operator to regulate the position of the shuttle to suit the varying sizes of type and reduce the friction to a minimum, so as to avoid unnecessary wear and injury of the type. The mounting of the shuttle upon the telescoping round rods and tubes adjacent to the ends of the shuttle and the arrangement of the springs thereon equalizes the spring-pressure upon the shuttle and causes it to work uniformly and freely irrespective of the location of the type in the type-race with reference to the shuttle.

It will be clear to those familiar with the style of machine to which my improvements apply that when the type passing through the type-race is presented with a plain face in engagement with one of the ribs 220 the type-turning dog 221 will have its nose projected beyond the inner face of the shuttle, so as to engage the corner of the advancing type and cause the type to make a quarter-revolution in the race, the shuttle and the jaws of the type-carrier yielding sufficiently to allow the movement of the type. When, however, a nick of the type passes over the rib, the rib will not be pressed in, and the dog will be allowed to remain in normal inactive position, allowing the type to proceed along the type-race without being rotated. The general plan of this type-turning shuttle is the same as in my previous patent above referred to, the details of construction only being claimed as new in my present case.

The type are taken successively from the hopper above described and carried by the first type-carrier into the type-race formed by the sill 190 and the yieldingly-mounted shuttle 210, the gradually-contracting opening of the type-race formed by the curved ends of the sill and shuttle directing the type in position and the jaws of the first type-carrier yielding sufficiently to allow the type to slide slightly in the jaws until the type rests in the position determined by the type-race. The first type-carrier then recedes and leaves the type in the race directly above the second type plunger or lifter, which I will now describe.

230 is the second type plunger or lifter, which is mounted in a suitable socket or casing 231, formed in the platform 3, and is connected through a pitman with the forward end of an operating-lever, which lever carries an antifriction-roller which travels upon the face of an operating-cam. This lever is journaled to the lower end of an adjustable rod 236, which passes up through an opening in a lug or boss formed integral with the lower face of the platform 3 and has a threaded upper end which screws into an interiorly-threaded adjusting-post having an operating hand-wheel 239 at its upper end and an annular collar or flange at its lower end, which is engaged by a yoked bracket 241, secured to the platform 3, for confining the adjusting-post in position.

The construction of the type-lifting plunger 230 and its supporting and operating mechanism just described is the same as above described in connection with the first type-lifting plunger 81. The upper surface of the type-lifting plunger 230 is faced with fiber or other suitable cushioning material 230$^a$. After the type is deposited in the type-race by the first type-carrier it is engaged by the second type-lifting plunger 230, just described, and raised in the race to the proper height to bring one of the nicks of the type in the same horizontal plane as the three ribs of the shuttle. The type is then engaged by the second type-carrier and carried part way through the type-race past the type-turning devices of the shuttle in a manner which I will now describe.

250 is a bracket adjustably mounted upon the reciprocating rod or bar 30 of the auxiliary carrier-supporting frame. Upon this bracket 250 is rigidly mounted the body 251 of the second type-carrier, which, it will be observed, extends in a horizontal plane from the supporting rod or bar 30 and embraces the type-sill 190. The type-carrier 251 is provided with two spring-pressed type-carrying jaws 255 and 265, each of which jaws has upper and lower fingers or sections which are adapted to engage the successive type in the type-race above and below the type-sill 190. The right-hand jaw 255, having upper and lower fingers or sections 255$^a$ and 255$^b$, is journaled to the carrier-body 251 at 256 and is yieldingly held in position by a spring 257, mounted upon a rod 258, which projects from the carrier-body 251 through an opening 259 in the jaw 255 and has threaded upon its outer end an adjustable tubular nut 260, within which the spring 257 is confined and by which it is held against the jaw 255. The tubular nut 260 not only serves to confine the spring 257 and regulate the spring-pressure upon jaw 255, but it also serves as a stop, with which the jaw 255 engages to limit the movement of the jaw upon its journal 256. In addition to the spring and limiting-stop for the jaw 255, which I have just described, I provide the jaw with a rearwardly-extending heel 261, which travels over a cam plate or bar 262, having alternate high and low portions. The purpose of the heel 261 and cam-bar 262 is to positively close the jaw 255 immediately after each type has been turned by the shuttle and hold the jaw positively closed while the type is being advanced between the turning operations of the shuttle-dogs, the low parts of the cam-bar allowing the jaw 255 to yield slightly under the action of the type as it is turning in the jaws by the action of the shuttle-dogs. The feature of the faces of jaw-sections 255$^a$ and 255$^b$ overlapping or projecting slightly beyond shoulders 251$^c$ of the carrier-body 251 is quite important in combination with the positive closing means for the jaw 255 when operating upon the type, as it is very necessary that the type be held snugly in engagement with the shoulders 251$^c$ to insure the turning action.

Projecting upwardly from the lower sections 255$^b$ of the jaw 255 is a pin 263, which is engaged at the limit of the forward stroke of the carrier by a pin 264, projecting from the type-sill 190, so as to relieve the type partially from the engagement of the jaw-sections 255$^a$ and 255$^b$ at the moment that the carrier is moved outwardly away from the type.

265 is the left-hand jaw of the type-carrier, formed of upper and lower fingers or sections. This jaw 265 is held normally closed by spring 266, mounted upon a post 267 of the carrier-body 251 and engaging the pin 268 of the jaw. A projection 269, extending from the type-sill 190, engages a lug or shoulder 270 of the type-jaw 265 at the limit of the rearward or right-hand motion of the carrier for opening the jaw 265 to allow the jaws to be moved inwardly over the type in the race.

It will be observed that the two sections of the right-hand jaw 255 are shaped to fit snugly against the cut-out portion 251$^a$ of the carrier-body, the lines of division 251$^b$ between the jaw-sections proper and the inner ends of the upper and lower plates of the carrier-body 251 being upon an arc drawn from the journal 256 of the type-jaw 255. It is important that these parts fit snugly together, particularly adjacent to the engaging faces of the jaws, in order to prevent thin type from becoming wedged between the jaw and carrier-body while they are being rotated. The operative faces of the jaw-sections 255$^a$ and 255$^b$ are curved forward slightly, and the upper and lower plates of the carrier-body are formed with shoulders 251$^c$, beyond which the adjacent ends of the curved faces of the jaw-sections 255$^a$ and 255$^b$ project slightly to insure the type moving forwardly against the carrier-body under the spring action of the shuttle at each turn or partial rotation of the type. This is desirable, because in turning the type naturally move away from the carrier-body toward the shuttle, and to insure the proper operation of the mechanism the type should be maintained in close relation to the type-sill 190 and shoulders 251$^c$ of the carrier-body 251. These shoulders 251$^c$ afford rigid advancing-points of the carrier, which assist materially in the turning of the type when its diagonally opposite corner is engaged by one of the shuttle-dogs 221, the yielding of the type-carrying jaws allowing at the same time the rotation of the type and the curvature of the jaws being such as to further assist this turning operation. The jaw-sections 255$^a$ and 255$^b$ also have forwardly-projecting curved hooks or noses 255$^d$, which serve the purpose of confining the type within proper limits in the jaws under the turning action, particularly under the action of the kicker, which I will presently describe. The curved operative faces of the jaw-sections 255$^a$ and 255$^b$ may also be formed with one or more teeth or shoulders 255$^e$, as indicated in dotted lines in Fig. 30 of the drawings, said teeth or shoulders assisting in the turning of the type when acted upon by the kicker.

As above pointed out, I have found some difficulty with the operation of the type-turning devices or shuttle of my machine when operating upon type having nicks of unusual depth. This difficulty has been the failure of the type-shuttle to impart the final turn to the type to bring the nicked faces of the type against the shuttle. This failure is due to the fact that when the type is advancing in the race in a position to require but one more turn the nicks of the type extend across the forwardly-presented face of the type and cut away the forward corner adjacent to the shuttle in the plane of the shuttle-ribs 220 to such an extent that before the type has half completed its quarter-turn the cut-out in said corner or shoulder of the type will so far release the pressure upon the shuttle-rib 220 that the dog 221 which is operating will be withdrawn from engagement with the type and the pressure of the spring-actuated carrier-jaws 255 and 265 will cause the type to be returned to its starting position, and it will still need a quarter-revolution to bring it into proper position for movement into the galley. If a type has such a deep nick in its face, it may pass all three of the turning devices of the shuttle without receiving the required final turning, and unless some means be provided to impart this final turn to the type in case of failure of the shuttle it will be clear that such type will be fed into the galley facing improperly. To overcome this defect in the machine as heretofore constructed, I have devised what I have termed a "kicker," which is a device preferably mounted upon the second type-carrier for imparting a final turn to the type before they are passed from the type-race to the galley.

275 is a longitudinally-movable rod or bar mounted in a central recess or channel of the carrier-body 251. This bar 275 has journaled to its front or outer projecting end an antifriction-roller 276, which is adapted to travel upon a pointed cam bar or plate 277 to impart an inward motion to the bar 275. In one face of the kicker-bar 275 is cut a groove or channel 278, in which rests a spiral spring 279, engaging at one end a shoulder 280 in the groove or channel of the kicker-bar 275 and at its other end a lug 281, projecting upwardly from the lower plate of the carrier-body 251. The spring 279 tends to move the kicker-bar 275 outwardly and holds the antifriction-roller 276 in operative engagement with the cam plate or bar 277. The kicker-bar 275 has cut into it adjacent to its inner end a kerf or groove 282, and mounted in this kerf or groove upon a journal-pin 283 is the kicker-finger 284, formed with a heel 285, projecting from it, with which engages a leaf-spring 286, mounted upon the kicker-bar 275. 287 is a cam-groove cut into the wall of the receiving socket or channel of the carrier-body adjacent to the forward end of the kicker-bar 275, with which cam-groove the heel 285 of the kicker-finger engages. As the kicker-bar 275 is moved inwardly in its channel the kicker-finger 284 will be moved upon its journal 283 by means of the spring 286 under control of cam-groove 287. The operative end of the kicker-finger 284 has formed on its inner type-engaging face a rib $284^a$, formed by cutting away the face of said finger upon one side of the longitudinal rib portion. At the rear of the rib $284^a$ is formed a type-engaging shoulder $284^b$ of the same depth as rib $284^a$ for the purpose presently to be explained. Assuming now that the shuttle-dogs have failed to impart the final turn to the type in the type-race for the reason above explained, the type, requiring but a single quarter-turn to properly position it, will be moved forward in the type-race by the jaws of the second type-carrier, and the kicker-bar will be moved inwardly by its cam 277, allowing the kicker-finger 284 to be closed upon the type by the action of its spring. As the nick of the type will be presented forwardly in the type-race, the rib $284^a$ of the kicker-finger (which is of course in the same horizontal plane as the dog-controlling ribs of the shuttle) will engage the nick of the type and allow the kicker-finger to close so far upon the type that the shoulder $284^b$ will engage the adjacent corner of the type, as illustrated in Fig. 32 of the drawings. The continued inward movement of the kicker-bar as the carrier advances will move the type outwardly away from the rigid shoulders $251^c$ of the type-carrier, where it is engaged only by the spring-jaws of the carrier, and will then impart to the type its final one-quarter turn to place it in proper position with the nicked face presented toward the shuttle. If the type has been properly turned by the shuttle before reaching the kicker, it will be presented to the kicker in the position shown in Fig. 31 of the drawings, in which case the plain face of the type will be engaged by the rib $284^a$ of the kicker-finger and the shoulder $284^b$ will not be allowed to engage the type, and hence the position of the type will not be changed. The curved hooks or noses $255^d$ of carrier-jaw 255 prevent the type from being thrown out of the carrier-jaws by the action of the kicker.

Mounted between the type-shuttle and galley and forming a part of the side wall of the type-race on the same side as the shuttle is an adjustably-mounted friction-plate 290, which is formed with a rearwardly-projecting fin or rib 291, fitting loosely within a horizontal guideway or slot 292, formed in the inner face of the adjustable supporting-block 293, which block 293 is formed with a rib 294 on its lower face, which engages in a guide-groove 295, formed in the upper face of the bed-plate 200. A set-screw 296 passes through an elongated opening 297 in block 293 and is threaded into a suitable opening in the bed-plate 200 to secure the block 293 in the desired adjusted position with relation to the type-sill 190. Mounted in circular recesses or openings in the inner face of the block 293 are spiral springs 299, which engage with the fin or rib 291 of the friction block or plate 290 and hold it outwardly with a yielding pressure, the friction-plate 290 being confined on block 293 by means of pins 300, mounted in the block 293 and passing through slots 301, formed in the fin or rib 291. The friction-plate 290 has a rearward beveled end $290^a$ to guide the type from the shuttle to a position between the friction-plate and type-sill 190 and a forwardly-projecting end $290^b$, which extends over adjacent to the inlet of the galley.

The importance of the improved construction of spring-pressed friction-plate of the type-race is due to the fact that the position of the friction-plate and its spring-pressure can be adjusted to a nicety without interfering with the uniform distribution of the spring-pressure upon the plate. The friction-plate can also be readily removed for repair or for access to other parts of the machine and be replaced without difficulty. In the old device of my former patent there are two independently-adjustable spring-pressed supporting-rods engaging the friction-plates at opposite ends, and it is very difficult with this old structure to adjust the spring-pressure uniformly upon all parts of the friction-plate. In this old structure the supporting-rods are mounted in stationary lugs on the machine-base, and it is impossible to remove the friction-plate without first removing the type-sill and other parts.

305 is the galley, which rests upon the auxiliary plate or frame-piece 5, with its vertical wall 305$^a$ held snugly against the lug or projection 192, above referred to, and a lug or shoulder 306, formed on the auxiliary frame or plate 5.

307 is a thumb-screw threaded into the forward edge of the auxiliary frame 5 and formed with the flattened face 307$^a$. This thumb-screw is adapted to engage the forward edge of the galley 305 and clamp it securely in place, a groove 308 on the under face of the galley engaging a lug 309, projecting from the upper face of frame-piece 5, for confining the galley against the lugs 192 and 306 to prevent its being shifted longitudinally of the machine. The flattened face 307$^a$ of the thumb-screw allows the galley to be removed when the screw is placed in position with its flat face flush with the under surface of the galley.

310 is the adjustable side wall of the galley, formed on its lower face with a dovetail rib 311, which slides in the dovetail groove 312, formed in the upper face of the galley. A central section of the rib 311 is cut out at 313 to receive a movable dovetail section 314, formed integrally with or rigidly secured to a screw 315, which passes up through an opening in the adjustable galley-wall and is engaged by a thumb-nut 317 at its upper end. The rib 311 and the movable section 314 have undercut shoulders or dovetails at one side only, the section 314 being placed in the cut-out portion 313, with its undercut shoulder presented oppositely with respect to the undercut shoulder of the rib 311. The purpose of this arrangement is to make it possible to bind the adjustable side wall of the galley more firmly in place, the oppositely-projecting dovetail or undercut shoulders being in engagement with opposite walls of the dovetail groove 312 of the galley.

318 and 319 are lugs projecting inwardly on the stationary and adjustable galley-walls for confining the movable galley-block which slides between the galley-walls and supports the type as they are composed and moved into the galley line by line.

320 is the adjustable galley-block, formed with a yielding plunger 321 at one end, acted upon by a spring 321$^a$ in socket 321$^b$ and confined by a screw 321$^c$, working in slot 321$^d$, and with an adjustable block 322, formed with a screw 323, which engages the longitudinal slot 324 of the galley-block and is confined in any desired adjusted position in the slot by means of a thumb-nut 325, threaded upon a screw-pin, which is mounted upon the block 322 and passes up through the slot 324. This adjustable galley-block can be adjusted to suit any adjusted position of the movable galley-wall for receiving lines of type of the desired length. The galley widens slightly toward its outer end for the purpose of freeing the type-lines from binding friction between the galley-walls.

The rigid galley-wall 305$^a$ is formed at its inner end adjacent to the forward end of the type-race with steel angle-plates 305$^b$ to resist wear, a central slot 305$^c$ being formed in the inner rigid wall of the galley to allow the passage of the lower type-advancing foot 252 of the type-carrier. These steel angle-plates are very important. If the end of the galley-wall were allowed to wear, the type would become twisted in passing the galley-wall in the type-race and would not be faced properly in the galley.

Directly back of the galley the bottom of the type-race is formed by the platform 3, and mounted upon the platform 3 adjacent to this extension of the type-race is a block 330, in which is mounted a friction-plate 331, confined by suitable pins 332 and pressed outwardly into operative engagement with a line of type by suitable springs (not shown) within the block 330. This friction-plate 331 has a beveled rear end, which overlaps the forward end 290$^b$ of the friction-plate 290.

335 is a slide-gate mounted in suitable bearings 336, so as to extend across the entrance to the type-race back of the galley and engaged by a leaf-spring 337, secured to the rear face of the block 330. The gate 335 is formed with two sections 335$^a$ and 335$^b$, formed with rearwardly-extending inclined webs or fingers, over which the advancing type passes for automatically opening the gate to admit the type. Between sections 335$^a$ and 335$^b$ the friction-plate 331 projects, and the lower type-advancing foot 252 of the type-carrier passes between them after advancing the type into the type-race back of the galley entirely clear of the gate 335, so as to allow it to automatically close.

340 is the vertically-movable rule, which separates the galley from the type-race in the rear of the galley. This rule 340 is mounted upon a yoke 341, which slides upon a rod 342, projecting downwardly from beneath the platform 3, a spiral spring 343 being mounted upon the rod 342 and confined between the yoke 341 and an adjustable collar 344, secured to the rod. The spring holds the yoke carrying the rule normally in elevated position with a yielding pressure, the rule 340 projecting normally up through a slot formed in the platform 3. The arrangement of the rod 342 and spring 343 beneath platform 3 is superior to the old form of this mechanism set forth in my above-named Patent No.

493,448 in that the parts are out of the way of the operator, the spring is required to carry less weight, and there is less friction upon the parts.

350 is a cut-off plate mounted in suitable horizontal slots in the block 330 upon two rods 351, which pass out through the rear of the block 330 and are joined by a bar 352, between which and the block 330 is mounted a spiral spring 453, which holds the cut-off plate 350 normally retracted within the block 330.

Journaled beneath the platform 3 is a short shaft 354, and projecting upwardly from said shaft through openings 355 in the platform 3 are two rock arms or fingers 356, which rest directly behind the bar 352 and serve to press said bar and the cut-off plate inwardly when the shaft 354 is rocked.

357 is a rock-arm keyed to shaft 354, and 358 is a pin journaled to the rock-arm 357 and projecting downwardly through a suitable opening formed in the yoke 341 and having adjustably mounted on its lower end a nut or collar, so that when the yoke 341 is moved downwardly by the mechanism which will presently be explained the yoke will engage the collar and pull downwardly upon it, causing shaft 354 to rock and the cut-off plate 350 to be projected inwardly for advancing a line of type into the galley, which movement of the cut-off plate by reason of its operative connection with the supporting-yoke of the line-dividing rule 340 can take place only after said rule has been drawn down to open communication with the galley for the reception of the advancing line of type. The provision of two rock-arms for actuating the cut-off plate is important because any length of line can be advanced into the galley without irregular strain or twisting. By adjusting the nut or collar upon the pin 358 the throw of the cut-off plate can be regulated.

The rule 340 is lowered at the proper time by means of an eccentric-pin 360 on a disk 361, keyed to the shaft 10, coming in contact with a sliding dog 362, mounted in a suitable dovetail bearing in the upper face of the yoke 341. Immediately after the yoke is lowered by this means the eccentric-pin 360 slips off of the dog 362 and allows the spring 353 to quickly raise the rule 350 to its elevated position, and immediately after this has taken place a cam 363 upon disk 361 rotates in engagement with the dog 362 and moves it backwardly in its bearing out of the path of the eccentric-pin 360, so as to avoid the lowering of the rule 320 upon the next revolution of the pin 360.

364 is a spring which tends to throw the dog 362 into the path of the eccentric-pin 360. The dog 362 is held normally out of the path of the pin 360 after it has been moved back by the cam 363 by the means which I will now describe.

The disk 361, as shown in Fig. 33, has one or more notches 361ᵃ cut in its edge, and a pivoted pawl or dog 361ᵇ is arranged to engage said notch or notches when an attempt is made to run the machine backward. This is for the purpose of preventing the injury of the machine by operating it backward by hand or power.

365 is a pin projecting upwardly from the dog 362 through a slot 366 in the platform 3, and 367 is a hook journaled at 368 upon the upper face of the platform 3 in position to engage pin 365 when dog 362 is moved out of the path of the eccentric-pin 360.

369 is a spring actuating the hook 367 to throw it into engagement with the pin 365 when the pin moves toward the hook. This hook mechanism retains the dog 362 in inoperative position until it is released by the line-feeling device, which is operated by the advancing line of type in the type-race back of the galley. This mechanism will now be described.

370 is a bracket extending slightly to the left of the machine, and 371 is a bell mounted upon the bracket.

372 is the bell hammer or striker, mounted upon a lever 373, journaled at 374 to the bracket 370, and 375 is a spring connecting the lever 373 with a pin 376 on the bracket. The heel of the lever 373 normally engages a pin 377 to prevent the spring throwing the striker-lever too far.

Upon the heel of the striker-lever 373 is formed a hook 378, with which engages the spring-pressed hook 379, mounted upon a yoke 380, which yoke 380 is adjustably mounted upon a pair of line-feeling rods 381, connected at their outer ends by a bar 382 and having sliding bearings in the inwardly-projecting flanges 383 of the bracket 370, said rods projecting through said flanges into the type race or cavity back of the galley in position to be engaged by the advancing line of type at the proper moment. The yoke 380 is adjustably mounted upon the feeler-rods 381 and is clamped in any desired adjusted position thereon by a thumb-screw 384, threaded into the yoke and engaging a flattened face upon the upper feeler-rod. This adjustment is necessary to regulate the feeling-rods to cause them to actuate the cut-off mechanism and rule above described at the proper time to suit a particular length of line which is being set up, also to actuate the indicator hereinafter described at the proper moment with respect to the length of line which is being composed.

Journaled upon a bracket-arm 385, extending from bracket 370, is a bell-crank lever 386, one arm of which extends over behind the heel of the spring-hook 367, so as to disengage said hook from the dog-controlling pin 365. The other end of said bell-crank lever 386 is supported in the path of an arm 387, projecting rearwardly from the yoke 380 of the feeler-rods 381, so that when the feeler-rods have been moved to the limit of their outward motion by the completion of the line of type in the type-race back of the galley said bell-crank lever 386 will be operated to release the hook 367 from the pin 365, when the spring 364 will throw the dog 362 over into the path of the eccentric-pin 360, which pin at this moment will engage the dog 362 and draw down the rule 340 and throw over the cut-off plate 350, as above explained. The movement of the cut-off plate removes the line of type just composed from the type-race back of the galley and places it in the galley, when the cut-off plate and rule will immediately return to their normal positions and the line-feeling rods 381 will be drawn back to their operative position by reason of their operating-spring 388, which connects the arm 387 with a pin 389, projecting from the rear face of the block 330. The return movement of the feeler-rods is also assisted by the spring of the indicator hereinafter referred to. Immediately after these parts have been returned to their normal position the dog 362 on the yoke 341 is moved back into inoperative position against the action of its spring by the cam 363, into which position it is locked by the engagement of the hook 367, as already explained.

395 is the indicator-post, mounted upon the bed-plate 200, adjacent to the type-receiving hopper 60, and 396 is a semicircular plate or platform upon the upper end of the post 395.

397 is the indicator-shaft, journaled at its opposite ends in the indicator-post 395 and resting at its lower end upon the thrust-bearing 398, mounted in the platform 3. The platform is recessed slightly at 399 around the bearing 398 to relieve the gear-wheel 400 from friction, said gear-wheel being keyed to the indicator-shaft 397 adjacent to its lower end. Mounted upon the upper end of the indicator-shaft is an indicator-finger 401, which is adapted to travel over the semicircular plate 396. At one edge of the plate 396 is a stop-flange 402, upon which is mounted a cushioning-spring 403 to cushion the return movement of the indicator-finger 401 when it is released by the line-indicating mechanism. The plate 396 is adapted to support an indicator-plate, such as 404 or 405, which is marked upon its face with scale-marks for different sizes of type, such as nonpareil, minion, brevier, and bourgeois. Each of these indicator-plates 404 or 405 is adapted to rest with its straight face against the small lugs 406 upon plate 396 and is formed with a semicircular recess 407 in its rear straight face, which engages the indicator-post 395, and a notch 408 at its forward-curved edge, with which engages a small spring-actuating dog 409, mounted on a sliding piston 410, supported in a socket beneath the plate 396 and provided with an operating-finger 411 and an actuating-spring 412. A coil-spring may be placed around shaft 397 within post 395 to return indicator to normal position.

The gear 400 at the lower end of the indicator-shaft 397 meshes with a rack-bar 413, from which a rod 413$^a$ extends to the left of the machine and passes through a suitable opening in the bracket-arm 387 of the yoke 380, an adjustable nut 414 being threaded upon the end of said rod 413$^a$ for the engagement of the bracket-arm 387. With this construction it will be observed that when the feeler-rods 381 start to move by the engagement of the line of type which is being formed in the galley-race the indicator-finger 401 will start to move over the indicator-plate 404 or 405 and will indicate to the operator the amount of space remaining to be filled in the line, so that he will be able to complete a word or fill up the space with the necessary quads or smaller spaces.

For the purpose of determining the adjustment of the yoke 380 upon the line-feeling rods 381 to suit a particular length of line, so as to cause the cut-off mechanism and indicator to be operated at the proper moments, I prefer to employ a gage, such as shown in Fig. 35 of the drawings, consisting of the block 415, formed with a finger 416, projecting at a right angle, and from which project at a right angle the lugs 417. This block is placed with its body portion against the movable galley-wall 310, as shown in Fig. 35 of the drawings, which will bring the lugs 417 in the path of the feeler-rods 381. The feeler-rods are then shifted to move their ends into engagement with the said lugs 417, when the yoke 380 is moved up into close contact with the inner flange 383 and the thumb-screw 384 is tightened. This will give the proper position of the feeler-rods for the particular length of line which is to be set, the length of line being determined by the distance apart of the galley-walls.

As a modification of the galley-securing devices I propose to employ the structure shown in Figs. 51, 52, 53, and 54 of the drawings. In this form of the devices the lower face of the galley is formed with a circular undercut recess 420, with which is adapted to engage a rotary cam 421, formed with a flaring cam-face 421$^a$ and mounted upon the upper end of a short shaft 422, which is journaled in a boss 423, formed integral with the auxiliary galley-supporting plate 5. The shaft 422 has an operating and limiting bar 424 and is longitudinally movable in its bearing 423, and upon the upper face of the auxiliary plate 5 is formed a cam-receiving recess 425, into which the cam 421 is adapted to be dropped when it is disengaged from the recess of the galley-plate. A pin 426 in the recess 425 is adapted to engage a low part or shoulder 421$^b$ of the cam 421 and prevent its rotation while in the recess 425 beyond a point where it will enter the recess 420 of the galley. With this device the recess of the galley-plate is so arranged with respect to the cam 421 that when the cam is pressed up into the recess 420 and rotated the flaring face of the cam will engage the undercut wall of the recess and securely lock the galley to its supporting-plate, and at the same time the position of the cam upon its shaft is such that the galley will be forced snugly to its seat in a diagonal direction up against the lugs 192 and 306 and hold the galley securely in this position. In the drawings of this mechanism Figs. 51 and 53 represent the parts in locked position, and Figs. 52 and 54 represent the parts in unlocked position.

For the purpose of measuring the extent of projection of the plungers or lifters 81 and 230 beyond their supporting-casings to suit a particular font of type which is to be used I prefer to employ the gage shown in Fig. 55 of the drawings, which consists of two bell-crank levers 435 and 436, pivoted together at 437. The arms 435$^a$ and 436$^a$ of these pivoted gage-levers are formed with plain noses, as shown. The arm 435$^b$ of lever 435 is formed with a square shoulder 438 and an arm 439, extending at a right angle thereto, and provided on its face with a scale 440 and with limiting-lugs 441. The arm 436$^b$ of the lever 436 is formed with a tapered indicator-point 442. It will be observed that in using this gage the type indicated by the reference-letter T is placed with its bottom face upon the shoulder 438 and its notched face presented toward the scale-arm 439, when the indicator-finger 442 is adjusted to engage one of the nicks or notches in the type-face. This position of the indicator-finger with respect to the other member of the gage will determine the distance the type-lifter plunger should project above its supporting-casing at the ends 435$^a$ and 436$^a$ of the gage, as indicated in Fig. 55 of the drawings, or the plungers 81 and 230 may be marked with scales 81$^b$ and 230$^b$, as shown is Fig. 10 of the drawings, said scales corresponding with the scale 440 upon the gage.

Having thus described my invention, the following is what I claim as new therein and desire to secure by Letters Patent:

1. In a type-setting machine, the combination of a type-chute, guideways extending transversely of the chute, the slide valves or gates operating in said guideways, a double-armed pivoted lever engaging the slide-valves, an operating-cam, and a reciprocating rod or bar connected with said double-armed lever and operated by said cam, substantially as set forth.

2. In a type-setting machine, the combination of a type-chute formed with a flaring opening at its lower end, suitable type engaging and determining devices supported beneath the lower end of the chute, and a type-lifting device mounted beneath the type engaging and determining devices, substantially as set forth.

3. In a type-setting machine, the combination of a type-chute, a type-lifting plunger supported beneath the chute, and a socket or casing supporting the plunger and formed with a flaring opening at its upper end, substantially as set forth.

4. In a type-setting machine, the combination of a type-chute having a flaring opening at its lower end, suitable type engaging and determining devices arranged beneath the chute, a socket or casing having a flaring upper end arranged beneath the type engaging and determining devices, and a type-lifting plunger supported in said socket or casing, substantially as and for the purpose set forth.

5. In a type-setting machine, the combination of a type-chute having a flaring opening at its lower end, traps or gates in said chute, suitable type-engaging feelers supported beneath the chute, a socket or casing having a flaring open upper end supported beneath the feelers, and a type-lifting plunger arranged in said socket or casing, substantially as and for the purpose set forth.

6. In a type-setting machine, the combination of a type-chute having a flaring open lower end, a socket or casing supported beneath the chute, and formed with a flaring open upper end, movable gates or sections forming parts of the lower end of the chute and the upper end of the socket or casing, means for intermittently moving said sections into opening position, and a type-lifting plunger supported in said socket or casing, substantially as set forth.

7. In a type-setting machine, the combination of means for directing type into the machine, with a type limiting and lifting plunger, a supporting and operating lever connected with said plunger through suitable means, a cam operating said lever, and an adjustable fulcrum for said lever, substantially as set forth.

8. In a type-setting machine, the combination of a type engaging and lifting plunger, an operating-cam, a lever suitably connected with said plunger and operated by said cam, a fulcrum-rod to which said lever is journaled, an adjustable support for said fulcrum-rod, and means for feeding type into operative relation with the plunger, substantially as set forth.

9. In a type-setting machine, the combination of a type-chute, with a type-lifting plunger supported beneath the chute, an operating-cam, a lever suitably connected with the plunger and operated by said cam, a fulcrum-rod to which said lever is journaled, an adjustable post having screw-threaded engagement with said rod, and means for confining the post in operative relation to the rod, substantially as set forth.

10. In a type-setting machine, the combination of a type-chute, a type-lifting plunger supported beneath the chute, means for raising and lowering the plunger, and an adjustable stop for limiting the upward movement of the plunger, substantially as set forth.

11. In a type-setting machine, the combination of a type-chute, a type-lifting plunger supported beneath the chute, a rod or pitman connected with the plunger, suitable operating means connected with said rod or pitman for raising and lowering the plunger, a lug projecting from said rod or pitman and a screw-stop threaded into said lug and adapted to engage a stationary part of the machine for limiting the upward movement of the plunger, substantially as set forth.

12. In a type-setting machine, the combination of a type-chute, suitable type-engaging feelers mounted beneath the chute and adapted to support a type in upright position and limit its upward movement, a type-lifting plunger mounted beneath the feelers, means for operating the feelers to cause them to first open to allow a type to pass through them to the plunger, and then close to engage and place the type in upright position upon the plunger, and suitable operating means for the plunger arranged to lower the plunger away from the type while the feelers are placing the type in upright position and afterward raise the type through the feelers, substantially as and for the purpose set forth.

13. In a type-setting machine, the combination of a type-chute, suitable type sustaining and limiting feelers mounted beneath the type-chute, means for opening and closing the feelers, a spring-actuated type-lifting plunger supported beneath the feelers, an operating-lever suitably connected with the plunger, and a cam controlling said lever and formed with a low portion to allow the raising of the plunger, an intermediate portion to hold the plunger normally in lowered position, and a short high portion to momentarily lower the plunger away from the type during the type-straightening operation of the feelers, substantially as and for the purpose set forth.

14. In a type-setting machine, the combination of a type-chute, spring-pressed type-feelers mounted beneath the type-chute; a vertically-movable yoke arranged to operate the feelers, a rod supporting said yoke, an operating-lever, an adjustable screw carried in one arm of said lever and engaging said supporting-rod, and a cam operating said lever, substantially as set forth.

15. In a type-setting machine, the combination of a rigid block or casting in which is formed a type-chute, a suitable hollow frame having an open side mounted beneath the chute, spring-pressed type-feelers mounted in said frame, a sliding yoke supported adjacent to said frame and adapted to close its open side, a spring-pressed type-feeler mounted in said sliding yoke, means for operating said feelers, a spring seated in a suitable recess in the block or casting and engaging the yoke to hold it normally closed, means for intermittently moving the yoke into open position, and a type-carrier, as set forth.

16. In a type-setting machine, the combination of a block or casting, a type-chute formed in said block or casting, a frame supported beneath the chute, a sliding yoke mounted upon the block or casting adjacent to the frame, spring-pressed feelers mounted upon the frame and yoke, means for operating the feelers, a movable section forming part of the lower end of the type-chute, a type-lifting plunger supported beneath the type-feelers, a socket or casing supporting the plunger, a movable section forming part of the upper end of the plunger socket or casing, means of engagement between the sliding yoke and the movable sections of the type-chute and plunger socket or casing, a spring seated in a suitable recess in the block or casting and engaging the yoke to hold it normally closed, means for intermittently moving the yoke and engaged movable sections into open position, and a type-carrier, as set forth.

17. In a type-setting machine, the combination of means for supplying type to the machine, and means for carrying the successive type through the machine, with two independent type-lifting plungers arranged to engage and raise the type at different points in the machine, independent supporting and operating levers suitably connected with the independent plungers, independent adjustable fulcrums for said levers, and means for operating said levers, substantially as set forth.

18. In a type-setting machine, the combination of a reciprocatory feed bar or frame, a type reversing or tumbler carrier having a shaft which is rotatably mounted upon said feed bar or frame, a spring retaining said carrier in normal position, a segment-gear and an eccentric pin or lug mounted upon the shaft of the tumbler-carrier, a stationary rack-bar with which said segment-gear is adapted to mesh for reversing the tumbler-carrier, a cam bar or track with which the eccentric pin or lug engages for holding the tumbler-carrier in reversed position, and a stop or projection adapted to engage the projecting end of a type held by the tumbler-carrier and start the reversal of the carrier and throw the segment-gear into mesh with the rack, substantially as set forth.

19. In a type-setting machine, the combination of a reciprocatory support, a tubular head mounted upon said support, a tumbler-carrier having a supporting-shaft which is journaled in said tubular head, a spiral spring surrounding the shaft of the tumbler-carrier within the tubular head and having one end secured to said shaft, a collar surrounding said shaft and adjustably mounted in the tubular head, to which collar the other end of said spring is attached, means for securing the collar in the desired adjusted position for regulating the tension of the spring, and means for reversing the position of the tumbler-carrier in its support, substantially as set forth.

20. In a type-setting machine, the combination of means for carrying type through the machine, and the type-race through which the type are passed, with a type-turning shuttle forming one side of the type-race, springs engaging the type-shuttle and holding it in operative position with a yielding pressure, and means for adjusting the pressure of the springs, substantially as and for the purpose set forth.

21. In a type-setting machine, the combination of means for carrying type through the machine, and a rigidly-mounted type-sill, with a type-turning shuttle, an adjustable support upon which said shuttle is movably mounted and by which it is held in operative relation to the type-sill, and suitable springs interposed between the shuttle and its adjustable support, substantially as set forth.

22. In a type-setting machine, the combination of means for carrying type through the machine, a rigidly-mounted type-sill, a type-turning shuttle, a shuttle-supporting block adjustable toward and away from the type-sill, means for securing said supporting-block in the desired adjusted position, means for movably mounting the shuttle upon said supporting-block, and springs interposed between the shuttle and its supporting-block, substantially as set forth.

23. In a type-setting machine, the combination of a rigidly-mounted type-sill forming one wall of the type-race a shuttle-supporting block adjustable toward and away from the type-sill, means for securing said block in the desired adjusted position, a type-turning shuttle, telescoping guide rods and tubes projecting from the shuttle and its supporting-block, by which the shuttle is movably mounted upon the block, spiral springs mounted upon said telescoping tubes and rods and engaging the shuttle and supporting-block for pressing the shuttle toward the type-sill with a yielding pressure, and means for carrying the type between the shuttle and type-sill, substantially as set forth.

24. In a type-setting machine, the combination of a type-race, a yieldingly-mounted type-turning shuttle forming one wall of the type-race and adapted to yield in a horizontal plane, pins or lugs supported beneath and just clear of the shuttle in position to resist any downward strain of the shuttle, and means for carrying type through the machine, substantially as set forth.

25. In a type-setting machine, the combination of a rigidly-mounted type-sill, a horizontally-yielding type-turning shuttle supported in operative relation to said sill to form therewith a type-receiving race, and a brace or stop resting above and just clear of the shuttle to resist any upward strain thereon, and means for carrying type through the machine, as set forth.

26. In a type-setting machine, the combination of a rigidly-mounted type-sill, a horizontally-yielding type-turning shuttle supported in operative relation thereto, an arm or brace projecting over the shuttle, an adjustable stop carried by said arm or brace and adapted to resist any upward strain upon the shuttle, and means for carrying type through the machine, substantially as set forth.

27. In a type-setting machine, the combination of a rigidly-mounted type-sill, a horizontally-yielding type-shuttle supported in operative relation thereto, pins or lugs mounted beneath and just free of the shuttle to resist any downward strain upon the shuttle, a brace or limiting-stop supported above and just free of the shuttle to resist any upward strain thereon, and means for carrying type through the machine, substantially as set forth.

28. In a type-setting machine, the combination of a rigidly-mounted type-sill, a horizontally-yielding type-turning shuttle supported in operative relation thereto, a type-lifting plunger mounted beneath the sill and shuttle and adapted to raise the type in the race formed by said sill and shuttle, a brace or limiting-stop supported above and just free of the shuttle to resist any upward strain thereon, and means for carrying type through the machine, substantially as set forth.

29. In a type-setting machine, the combination of a type-race formed of a rigid wall and a sectional yielding wall, one section of said yielding wall consisting of a friction plate or block, a supporting-block adjustable toward and away from the rigid wall of the type-race, springs interposed between said friction plate or block and its supporting-block, and means for carrying type through the type-race, substantially as set forth.

30. In a type-setting machine, the combination of a type-race having a rigid wall and a yielding wall, the rigid wall of which is formed of an adjustably-mounted type-sill, means for securing said type-sill in the desired adjusted position, and means for carrying type through the machine, substantially as set forth.

31. In a type-setting machine, the combination of a type-race, a rigid type-sill forming one wall of said type-race, an arm or block to which said sill is secured, said arm or block having an elongated opening or slot through it, a support for said arm or block, a securing-screw passing through the elongated opening or slot of said arm or block into the support, an adjusting-screw threaded into said arm or block and extending into the elongated opening or slot to engage the securing-screw and determine the adjusted position of the arm or block and the type-sill supported thereby, and means for carrying type through the type-race, substantially as set forth.

32. In a type-setting machine, the combination of a type-race, and means for turning type upon their longitudinal axes therein, with a reciprocating type-carrier comprising spring-pressed jaws, the type-engaging face of the rear one of the jaws being curved forwardly, means for reciprocating said type-carrier, and means for operating the jaws, substantially as set forth.

33. In a type-setting machine, the combination of a type-race through which type are adapted to be successively passed, means for turning type upon their longitudinal axes in the type-race, and a type-carrier comprising two spring-pressed jaws, means for limiting the extent of opening one of said jaws, and means for operating said type-carrier, substantially as set forth.

34. In a type-setting machine, the combination of a type-race, means for turning type upon their longitudinal axes in the type-race, and a type-carrier having two spring-pressed jaws, a rod projecting from the carrier-body through one of said jaws, an adjustable tubular nut mounted upon said rod, and a spring surrounding said rod within the nut and engaging the nut and said carrier-jaw, and means for operating the type-carrier, substantially as set forth.

35. In a type-setting machine, the combination of a type-race, means for turning type upon their longitudinal axes in the type-race, a type-carrier, a type-engaging shoulder formed on the carrier-body, a type-engaging jaw mounted upon the carrier-body and having its operative face projecting beyond the type-engaging shoulder of the carrier-body when the jaw is in closed position, and means for operating the type-carrier, substantially as set forth.

36. In a type-setting machine, the combination of a type-race, means for turning type upon their longitudinal axes, a type-carrier, a type-engaging shoulder formed upon the carrier-body, a pair of spring-pressed jaws mounted upon the carrier-body, one of said jaws having a curved type-engaging face which slightly overlaps or projects beyond the type-engaging shoulder of the carrier-body, and means for operating said type-carrier, substantially as set forth.

37. In a type-setting machine, the combination of a type-race, means for turning type upon their longitudinal axes, a type-carrier having a type-engaging shoulder on the carrier-body, spring-pressed type-engaging jaws, and means for intermittently and positively closing the rear one of said jaws, with proper relation to the operation of the type-turning means, substantially as set forth.

38. In a type-setting machine, the combination of a type-race, means for turning type upon their longitudinal axes, a type-carrier having spring-pressed type-engaging jaws, a heel projecting from one of said jaws, a cam-bar with which said heel engages for intermittently and positively closing said jaw, and means for operating the type-carrier, substantially as set forth.

39. In a type-setting machine, the combination of a type-race, means for turning type upon their longitudinal axes, a type-carrier having a type-engaging shoulder upon the carrier-body, spring-pressed type-engaging jaws upon the carrier-body, one of said jaws having a type-engaging face which projects beyond the type-engaging shoulder of the carrier-body, a heel projecting from said type-engaging jaw, a cam-bar with which said heel engages for intermittently and positively closing said jaw, and means for operating the type-carrier, substantially as set forth.

40. In a type-setting machine, the combination of a type-race, and means for carrying type through the type-race, with a type-turning device constructed and arranged to turn a type upon its longitudinal axis, and adapted to be operated by the presentation of a plain face of a type toward it, and an independent type-turning device also constructed and arranged to turn a type upon its longitudinal axis, and adapted to be operated by the presentation of the nicked face of a type toward it, substantially as set forth.

41. In a type-setting machine, the combination of a type-race, and means for conveying type through the race, with a plurality of independent type-turning devices constructed and arranged to independently and successively turn a type upon its longitudinal axis, and each device adapted to be operated by the presentation of a plain face of a type toward it, and an independent type-turning device constructed and arranged to turn a type upon its longitudinal axis, and adapted to be operated by the presentation of the nicked face of a type toward it, substantially as and for the purpose set forth.

42. In a type-setting machine, the combination of a type-race, and means for carrying type therethrough, with a type-turning device comprising a type-engaging dog and a type-actuated controlling-rib suitably connected with the dog and adapted to force the dog into engagement with a corner of the type when a plain face of the type engages the rib, and an independent type-turning device comprising a ribbed finger, having a type-engaging shoulder of approximately the same height as the rib, which shoulder is adapted to engage the corner of the type when the rib enters a nick of the type, but which is prevented from engaging the type when the rib engages a plain face of the type, substantially as set forth.

43. In a type-setting machine, the combination of a type-race, and means for conveying type therethrough, with a movable type-turning device comprising a ribbed finger having a type-engaging shoulder of approximately the same height as the rib and adapted to be moved into engagement with the type and transversely of the type while it is in engagement, said type-engaging shoulder being adapted to engage a corner of the type when the rib enters a nick of the type, and is prevented from engaging the type when the said rib engages a plain face of the type, substantially as set forth.

44. In a type-setting machine, the combination of a type-race, and means for carrying type therethrough, with a type-turning device comprising a support movable transversely of the type-race and a finger pivoted upon said support and formed with a type-engaging shoulder and a nick-engaging rib, and means for operating said type-turning device, substantially as set forth.

45. In a type-setting machine, the combination of a type-race, and means for carrying type therethrough, including a suitable reciprocating body, with a type-turning device comprising a bar longitudinally movable in said body, a spring-pressed type-engaging finger pivoted upon said bar and formed with a nick-engaging rib and a type-engaging shoulder, and means for operating said type-turning device, substantially as set forth.

46. In a type-setting machine, the combination of a type-race, a type-carrier adapted to pass type through said race, and a type-turning device mounted upon said type-carrier and including a type-engaging finger formed with a nick-engaging rib and a type-engaging shoulder, substantially as set forth.

47. In a type-setting machine, the combination of a type-race, and a type-carrier having spring-pressed type-engaging jaws which are adapted to pass the type successively through said race, the rear one of which jaws is formed with a forwardly-curved hook, with a type-turning device mounted upon said carrier and comprising a longitudinal movable bar and a finger pivoted upon said bar and formed with a nick-engaging rib and a type-engaging shoulder, substantially as set forth.

48. In a type-setting machine, the combination of a type-race, and a type-carrier provided with spring-pressed type-engaging jaws, with a longitudinal movable bar mounted in the carrier-body, a type-turning finger having a nick-engaging rib and a type-engaging shoulder and pivotally mounted upon said bar, a spring tending to throw said pivoted finger toward one of the carrier-jaws, a heel projecting from said finger, and a cam-groove cut in the carrier-body with which said heel engages for controlling the action of the type-turning finger, means for operating the type-carrier, and means for intermittently moving said bar in the carrier-body, substantially as set forth.

49. In a type-setting machine, the combination of a suitable frame, suitable means for setting type, a removable galley formed with an undercut recess in its under face, and a locking-cam mounted upon the machine-frame and adapted to be projected into the recess of the galley and securely lock the galley in place, substantially as set forth.

50. In a type-setting machine, the combination of a suitable frame, means for setting type, a removable galley adapted to rest upon the frame and formed with an undercut circular recess in its lower face, a locking-cam mounted upon an operating shaft or bar, a bar in the frame in which said cam shaft or bar is rotatably and longitudinally movable, and a recess in the frame into which the locking-cam can be withdrawn, substantially as and for the purpose set forth.

51. In a type-setting machine, the combination of a suitable frame having a cam-receiving recess, a galley-locking cam supported within said recess and formed with an undercut locking-face and with a limiting-shoulder, a pin or lug in said recess with which said limiting-shoulder of the cam is adapted to engage, and a removable galley adapted to rest upon the machine-frame and formed with an undercut recess in its lower face with which the locking-cam is adapted to engage, substantially as set forth.

52. In a type-setting machine, the combination of suitable means for setting type, and a galley formed with a dovetail groove in its upper face, with an adjustable galley-wall formed with a rib having an undercut shoulder at one side and adapted to engage in the dovetail groove of the galley, said rib having a cut-out portion, a movable block or section set in said cut-out portion of the rib and formed with an undercut shoulder projecting oppositely from the undercut shoulder of the rib, and a clamp-screw and nut connected with said movable block and adapted to clamp the movable galley-wall in the desired adjusted position, substantially as set forth.

53. In a type-setting machine, the combination of means for setting type, with a type-receiving galley having walls which diverge slightly from its receiving end, substantially as and for the purpose set forth.

54. In a type-setting machine, the combination of means for setting type, with a type-receiving galley having walls which diverge slightly from its type-receiving end, and a galley friction-block engaging the side walls of the galley and adapted to support the composed type, substantially as set forth.

55. In a type-setting machine, the combination of means for setting type, and a type-galley, with a galley friction-block having a spring-pressed plunger at one end and an adjustably-mounted block provided with a clamping device by which it may be secured in the desired adjusted position, substantially as set forth.

56. In a type-setting machine, the combination of means for setting type, a galley adapted to receive the successive lines of type, a cut-off device adapted to advance the lines of type into the galley, a depressible rule dividing the galley from the type-race, a rod projecting beneath the machine-frame, a yoke mounted upon said rod and supporting the rule, a spring confined upon said rod and supporting the yoke, and means for automatically and intermittently operating the line cut-off and the rule, substantially as set forth.

57. In a type-setting machine, the combination of means for setting type, a galley adapted to receive the lines of type, and a line-advancing cut-off device comprising a plate mounted upon a suitable yoke, a spring holding said cut-off plate normally in retracted position, a rock-shaft, rock-arms projecting from said rock-shaft and engaging the yoke of the cut-off plate at two widely-separated points, and means for intermittently operating said rock-shaft, substantially as set forth.

58. In a type-setting machine, the combination of means for setting type, a suitable line cut-off, a controlling device for the line cut-off, a signal-bell, and a striker mechanism for said bell consisting of a spring-hook mounted upon the cut-off-controlling device, and a spring-hook carrying the bell-striker and mounted upon a stationary part of the machine in position to be engaged by the hook of the controlling device, substantially as set forth.

59. In a type-setting machine, the combination of means for setting type, a line-cut-off device, and controlling means for the line-cut-off device including a sliding bracket which is adapted to release the line cut-off, line-feeling rods passing through said sliding bracket into the path of the advancing line of type, and means for securing the line-feeling rods in any desired adjusted position upon the sliding bracket, substantially as set forth.

60. In a type-setting machine, the combination of means for setting type, a line-feeling device, an indicator-shaft, a gear upon said indicator-shaft, a rack-bar meshing with said gear and suitably connected with the line-feeler, a thrust-bearing for said indicator-shaft, and an indicator-finger mounted upon said shaft, substantially as set forth.

61. In combination with a type-setting machine, an indicator suitably actuated by an operative part of the machine, and a removable dial-plate over which the indicator is adapted to travel, substantially as set forth.

62. In a type-setting machine, the combination of a suitable base-frame having posts or standards projecting therefrom, a suitable bed-plate carrying the operative parts of the machine and hinged at its rear edge to the rear posts or uprights of the base-frame, and resting at or near its front edge upon the forward posts or uprights of the base-frame, substantially as set forth.

63. In a type-setting machine, the combination of a suitable base, a bed-plate carrying the operative parts of the machine and hinged to said base at its rear edge, a galley-supporting plate mounted upon said bed-plate, and a bracing-arm secured to the galley-supporting plate and projecting down into engagement with the base-frame, substantially as set forth.

64. In a type-setting machine, the combination of a suitable base-frame, a bed-plate carrying the operative parts of the machine and supported above the base-frame, an auxiliary carrier-frame mounted upon the bed-plate and adapted to be reciprocated transversely thereof, a bracket-arm projecting downward from said auxiliary carrier-frame, an antifriction-roller journaled in said bracket-arm, and a bracket mounted upon the base-frame upon which said antifriction-roller rests and reciprocates, substantially as set forth.

65. In a type-setting machine, the combination of a suitable bed-plate carrying the operative parts of the machine, an auxiliary carrier-frame mounted upon the bed-plate, a reciprocating carrier-bar mounted in the auxiliary frame, type-carriers mounted upon said carrier-bar, a bracket-arm projecting from the auxiliary frame and formed at its end with a horizontal guide-yoke, and a bracket-arm projecting from the reciprocating carrier-bar and engaging and sliding in the horizontal guide-yoke, substantially as set forth.

ALBAN V. RUCKMICH.

Witnesses:
J. GREEN,
WM. E. KNIGHT.